United States Patent
Horiki

(10) Patent No.: US 10,574,017 B2
(45) Date of Patent: Feb. 25, 2020

(54) TERMINAL INSERTION DEVICE AND WIRING MODULE MANUFACTURING METHOD

(71) Applicant: SUMITOMO WIRING SYSTEMS, LTD., Mie (JP)

(72) Inventor: Hideoki Horiki, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 239 days.

(21) Appl. No.: 15/558,374

(22) PCT Filed: Mar. 3, 2016

(86) PCT No.: PCT/JP2016/056535
§ 371 (c)(1),
(2) Date: Sep. 14, 2017

(87) PCT Pub. No.: WO2016/147876
PCT Pub. Date: Sep. 22, 2016

(65) Prior Publication Data
US 2018/0083405 A1    Mar. 22, 2018

(30) Foreign Application Priority Data

Mar. 19, 2015 (JP) ................. 2015-055833

(51) Int. Cl.
*H01R 43/20* (2006.01)
*H01B 13/012* (2006.01)
*B60R 16/02* (2006.01)

(52) U.S. Cl.
CPC ....... *H01R 43/20* (2013.01); *H01B 13/01209* (2013.01); *B60R 16/0207* (2013.01); *Y10T 29/49169* (2015.01); *Y10T 29/53213* (2015.01)

(58) Field of Classification Search
CPC .. H01R 43/20; H05K 13/06; Y10T 29/49174; Y10T 29/53209; Y10T 29/53213;
(Continued)

(56) References Cited

U.S. PATENT DOCUMENTS 4,967,470 A    11/1990  Folk
5,355,583 A    10/1994  Osumi et al.
(Continued)

FOREIGN PATENT DOCUMENTS

JP    05-082231    4/1993
JP    06-052962    2/1994
(Continued)

OTHER PUBLICATIONS

Search Report issued in International Bureau of WIPO Patent Application No. PCT/JP2016/056535, dated May 31, 2016.

*Primary Examiner* — Peter Dungba Vo
*Assistant Examiner* — Joshua D Anderson
(74) *Attorney, Agent, or Firm* — Greenblum & Bernstein, P.L.C.

(57) ABSTRACT

An object is to be able to inexpensively manufacture a holder that holds a connector for inserting a terminal. A terminal insertion device inserts a terminal into a cavity formed in a connector. The terminal insertion device includes: a holder in which a holding recess is formed; a push mechanism that pushes the connector held inside the holding recess so as to protrude from the opening; a positioning portion that receives and positions the connector at a position forward of the opening; and a terminal insertion mechanism that inserts the terminal into the cavity of the connector positioned by the positioning portion.

10 Claims, 17 Drawing Sheets

(58) Field of Classification Search
CPC ......... Y10T 29/53222; Y10T 29/53226; Y10T 29/5323; Y10T 29/53235; Y10T 29/53239; Y10T 29/53243
See application file for complete search history.

(56) References Cited

U.S. PATENT DOCUMENTS

| | | | |
|---|---|---|---|
| 2005/0071992 A1* | 4/2005 | Kinoshita | H01R 43/015 29/747 |
| 2006/0063430 A1* | 3/2006 | Furuya | H01R 43/20 439/595 |
| 2011/0214283 A1* | 9/2011 | Goto | H01R 43/20 29/747 |
| 2016/0203890 A1 | 7/2016 | Horiki et al. | |
| 2016/0211056 A1 | 7/2016 | Horiki et al. | |
| 2016/0294143 A1 | 10/2016 | Horiki | |
| 2016/0329675 A1 | 11/2016 | Horiki | |
| 2016/0352059 A1 | 12/2016 | Horiki | |

FOREIGN PATENT DOCUMENTS

| | | |
|---|---|---|
| JP | 07-106044 | 4/1995 |
| JP | 07-240267 | 9/1995 |
| JP | 2007-059286 | 3/2007 |
| JP | 2010-277885 | 12/2010 |
| JP | 2015-043268 | 3/2015 |

\* cited by examiner

FIG. 14
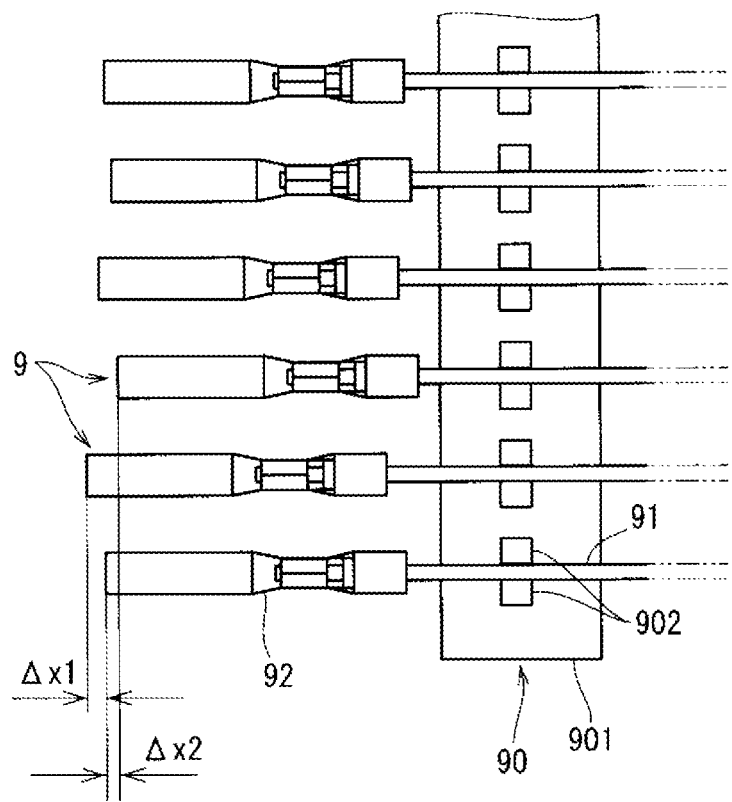
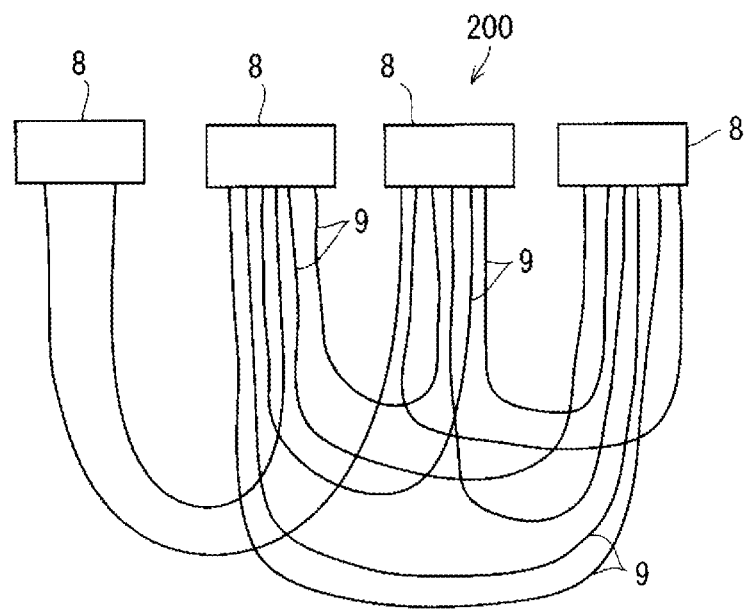
FIG. 15

TERMINAL INSERTION DEVICE AND WIRING MODULE MANUFACTURING METHOD

TECHNICAL FIELD

The present invention relates to a technique for inserting a terminal at a wire end portion to a connector.

BACKGROUND ART

Patent Document 1 discloses a device that inserts a terminal into a connector housing held by a fixture.

Other techniques for inserting a terminal into a connector housing are disclosed in Patent Documents 2 to 5.

CITATION LIST

Patent Documents

Patent Document 1: JP H6-52962A
Patent Document 2: JP H5-82231A
Patent Document 3: JP H7-106044A
Patent Document 4: JP H7-240267A
Patent Document 5: JP 2007-59286A

SUMMARY OF INVENTION

Technical Problem

In order to stably insert a terminal into a cavity of a connector, the connector needs to be held with a high level positional accuracy. For this purpose, a fixture that holds the connector has to be processed with a high level of accuracy. This will result in an increase in the manufacturing costs of the fixture.

Therefore, it is an object of the present invention to be able to inexpensively manufacture a holder that holds a connector for inserting a terminal.

Solution to Problem

To solve the above-described problem, a first aspect is directed to a terminal insertion device for inserting a terminal into a cavity formed in a connector, including: a holder in which a holding recess that is open on one side and that holds the connector so as to be movable along a direction of insertion of the terminal into the cavity is formed; a push mechanism that pushes the connector held inside the holding recess so as to protrude from the opening; a positioning portion that receives and positions the connector at a position forward of the opening; and a terminal insertion mechanism that inserts the terminal into the cavity of the connector positioned by the positioning portion.

A second aspect is directed to the terminal insertion device according to the first aspect, wherein a pushing hole portion is formed in a portion of the holder that is located on a side opposite to the opening, and the push mechanism includes a pushing portion that is inserted into the holding recess through the pushing hole portion and that pushes the connector.

A third aspect is directed to the terminal insertion device according to the first or second aspect, further including a holder transport mechanism that transports a plurality of the holders along a connector transport path in a state in which the holders are arranged, wherein the push mechanism and the positioning portion are provided at a position in the connector transport path at which the terminal insertion mechanism inserts the terminal into the cavity of the connector held by each of the holders.

A fourth aspect is directed to the terminal insertion device according to any one of the first to third aspects, wherein the positioning portion includes a first positioning portion that abuts against a portion of the connector that is located on a side where the terminal is inserted, and a second positioning portion that abuts against opposite side portions of the connector, and an edge portion of the second positioning portion that is located on the holder side is formed as a guide portion that gradually expands outward toward the holder.

A fifth aspect is directed to a wiring module manufacturing method for inserting a terminal at an end portion of a terminal-equipped wire into a cavity of a connector, the method including steps of (a) pushing a connector held by a holder against a connector positioning portion by moving the connector so as to protrude from the holder; and (b) inserting a terminal into a cavity of the connector positioned by the positioning portion.

Advantageous Effects of Invention

According to the first aspect, in a state in which a connector is received and positioned by a positioning portion at a position forward of the opening of a holder, a terminal can be inserted into a cavity of the connector. Accordingly, the terminal can be stably inserted in a state in which the connector is accurately positioned. As this time, the portion of the connector that protrudes from the opening of the holder is positioned by the positioning portion, and therefore, the holder does not have to be manufactured so accurately. Accordingly, the holder that holds the connector can be manufactured inexpensively.

According to the second aspect, in a state in which the connector is held inside the holding recess, the pushing portion can be inserted into the holding recess through the pushing hole portion, and the connector can be pushed.

According to the third aspect, the plurality of holders transported by the holder transport mechanism do not need to be manufactured so accurately. The positioning portion and the push mechanism may be provided at a position corresponding to the terminal insertion mechanism. Accordingly, the terminal insertion device can be manufactured relatively inexpensively.

According to the fourth aspect, the connector can be positioned by being smoothly abutted against the first positioning portion and the second positioning portion. The connector can be guided by the guide portion so as to abut against the second positioning portion.

According to the fifth aspect, in a state in which a connector protrudes from a holder and is positioned by being pushed against a positioning portion, a terminal can be inserted into a cavity of the connector. Accordingly, the terminal can be stably inserted in a state in which the connector is accurately positioned. At this time, the portion of the connector that protrudes from the holder is positioned by the positioning portion, and therefore, the holder does not have to be manufactured so accurately. Accordingly, the holder that holds the connector for inserting the terminal can be manufactured inexpensively.

BRIEF DESCRIPTION OF DRAWINGS

FIG. 14 is a plan view of end portions of terminal-equipped wires fastened to a wire arrangement member.

FIG. 15 is a schematic diagram showing a wiring module.

DESCRIPTION OF EMBODIMENTS

Figure 1:
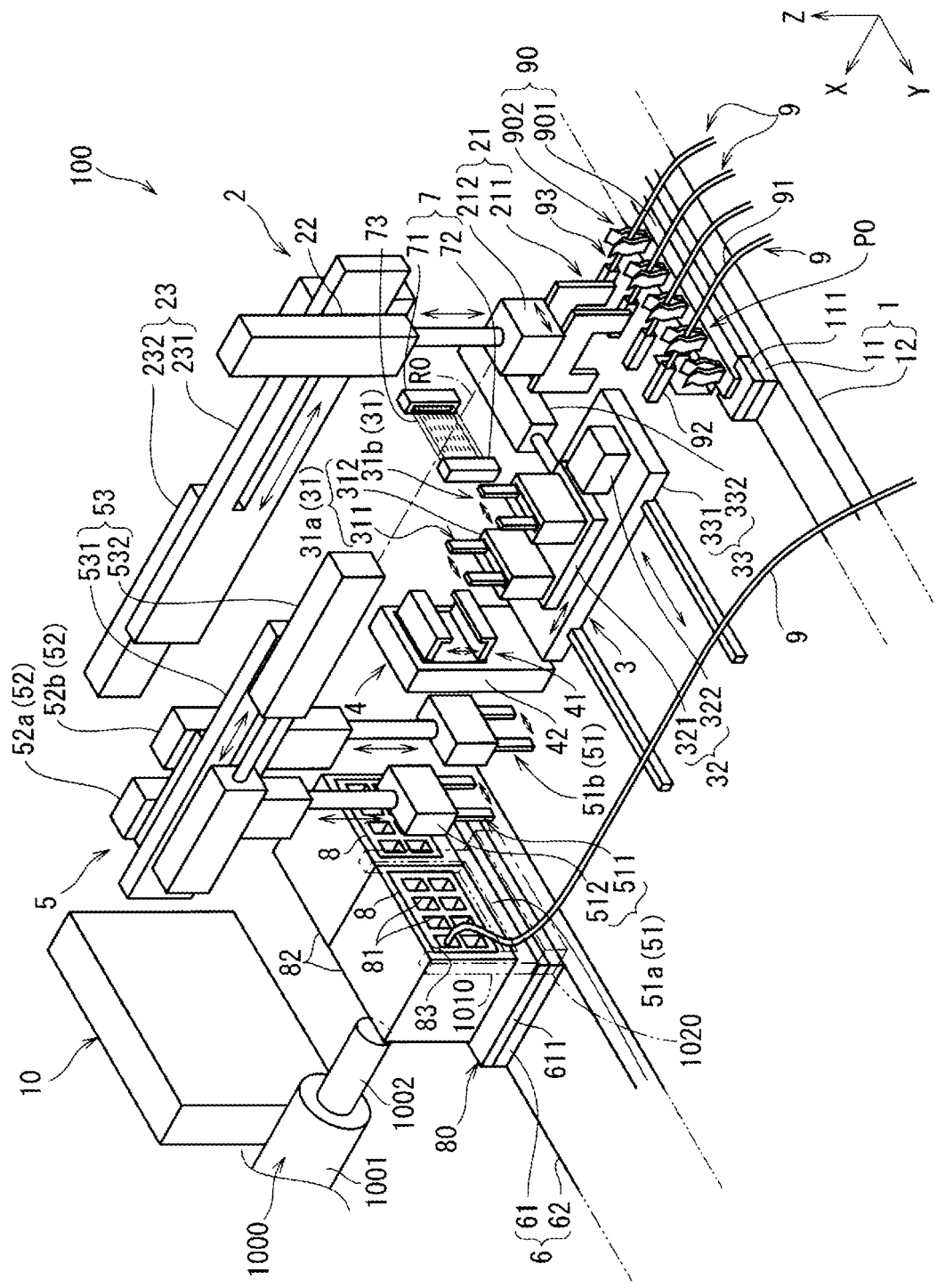
FIG. 1 is a schematic perspective view of a terminal insertion device according to an embodiment.

Hereinafter an embodiment will be described with reference to the accompanying drawings. The following embodiment is merely an exemplary embodiment of the present invention, and is not construed to limit the technical scope of the present invention.

Terminal Insertion Device

First, an overall configuration of a terminal insertion device 100 according to an embodiment will be described with reference to FIGS. 1 and 2. The terminal insertion device 100 is a device for manufacturing a wiring module 200 (see FIG. 15) including at least one terminal-equipped wire 9 and at least one connector 8 by inserting a terminal 92 at an end portion of the terminal-equipped wire 9 into a cavity 81 of the connector 8. In particular, the terminal insertion device 100 according to the present embodiment is a device for manufacturing a wiring module 200 including a plurality of terminal-equipped wires 9 and a plurality of connectors 8. Note that the above-described wiring module 200 alone is formed as a bundle in a shape following a wiring path in a vehicle or the like, and is configured as an electric wiring wire harness in the vehicle. Alternatively, the above-described wiring module 200 is combined with at least one of another wiring module and another wire, is formed as a bundle in a shape following a wiring path in a vehicle or the like, and is configured as an electric wiring wire harness in the vehicle.

Figure 2:
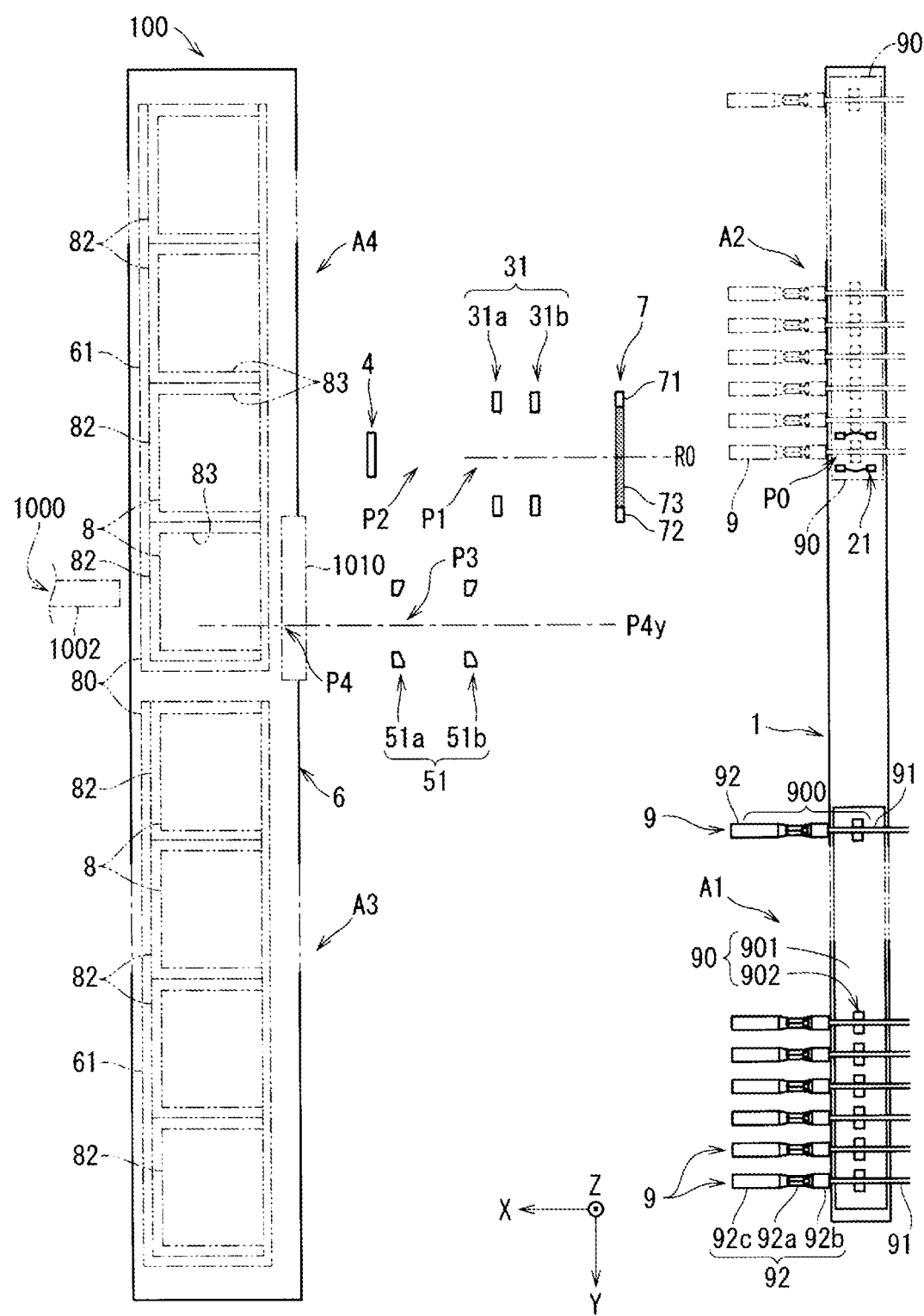
FIG. 2 is a schematic plan view of the terminal insertion device.

For the sake of convenience, the details of the shape, size, and the like of the illustrated constituent elements may not necessarily match between FIGS. 1 and 2. In addition, the illustration of a part of the mechanism shown in FIG. 1 has been omitted in FIG. 2.

The terminal insertion device 100 includes a wire arrangement member transfer mechanism 1, terminal insertion mechanisms 2 to 5, a connector arrangement member transfer mechanism 6, a photosensor 7, and a control portion 10. The terminal insertion mechanisms 2 to 5 include a first clamping portion-associated mechanism 2, a second clamping portion-associated mechanism 3, a third clamping portion-associated mechanism 4, and a fourth clamping portion-associated mechanism 5. Note that the terminal insertion device 100 does not necessarily include all of these components. For example, the terminal insertion device may include a holder 82, a push mechanism 1000, a positioning portion 1010, and only the fourth clamping portion-associated mechanism of the terminal insertion mechanisms 2 to 5.

In the following, the overall configuration of the terminal insertion device 100 will be described first, and thereafter, the description will focus on a configuration for positioning the connector 8 during insertion of the terminal 92 into the connector 8.

Terminal-Equipped Wire

Each of the terminal-equipped wires 9 includes a wire 91 and a terminal 92 connected to an end portion of the wire 91. The wire 91 is an insulated wire including a linear conductor and an insulating covering that surrounds and covers the conductor. The terminal 92 is a conductive member such as a member made of metal. The terminal 92 in the present embodiment is a crimped terminal, and includes a conductor crimped portion 92a that is crimped to a conductor exposed at an end portion of the wire 91, a covering crimped portion 92b that is crimped to the portion of the insulating covering of the wire 91, and a connection portion 92c that is used for connection to a mating terminal (see FIG. 2).

In many cases, the connection portion 92c is in the form of a tubular (e.g., a rectangular tubular) male terminal, or in the form of a plate-shaped or pin-shaped male terminal.

Connector

Each of the connectors 8 is a member in which a plurality of cavities 81 that accommodate respective terminals 92 of the terminal-equipped wires 9 are formed. A body that forms the outside shape of the connector 8 is a non-conductive member, which is, for example, a member made of a synthetic resin such as polypropylene (PP), polyethylene (PE), polyvinyl chloride (PVC), polyethylene terephthalate (PET), or polyamide (PA). The connector 8 may contain, inside the body, a bus bar (not shown) that comes into contact with the terminal 92 of the terminal-equipped wire 9 inserted into the cavity 81.

Cavities 81 into each of which a terminal 92 can be inserted are formed in a predetermined arrangement configuration in the connector 8. Inside each cavity 81, a lance or the like is provided as a locking structure capable of retaining and locking the terminal 92. When the terminal 92 is inserted into a cavity 81, the lance or the like retains and locks the terminal 92, thus holding the terminal 92 inside the cavity 81.

If the connector 8 rattles during insertion of the terminal 92 into the connector 8, the axial direction of the terminal 92 is inclined relative to the axial direction of the cavity 81. This may cause the terminal 92 to be caught inside the cavity 81, and thus the insertion operation of the terminal 92 cannot be stabilized. Therefore, it is preferable that the connector 8 is held in an orientation that is as constant as possible.

Wire Arrangement Member Transfer Mechanism

The wire arrangement member transfer mechanism 1 is a mechanism that moves the wire arrangement member 90, while removably holding the wire arrangement member 90. The wire arrangement member 90 includes a long base portion 901, and a plurality of wire fastening portions 902 that are formed so as to stand upright from the base portion 901. Each of the wire fastening portions 902 includes a pair of members that clamp and fasten, using an elastic force, a portion of the wire 91 of the terminal-equipped wire 9 that is located near the terminal 92.

The plurality of wire fastening portions 902 are formed so as to be arranged in a line on the base portion 901. In the wire arrangement member 90, each of the wire fastening portions 902 clamps and fastens the wire 91 of each of the terminal-equipped wires 9 in a state in which the distal ends of the respective terminals 92 of the terminal-equipped wires 9 face in the same direction. The arrangement direction of the wire fastening portions 902 is a direction orthogonal to the direction in which the distal ends of the respective terminals 92 of the terminal-equipped wires 9 face.

For example, the pair of members of each wire fastening portion 902 themselves are elastically deformable members, and clamp and fasten the wire 91 using an elastic force resulting from elastic deformation. Alternatively, the pair of members of the wire fastening portion 902 may apply an elastic force in the direction of moving toward each other using an elastic body such as a spring (not shown).

Ordinarily, the terminals 92 are connected to opposite end portions of each of the terminal-equipped wires 9 fastened to the wire arrangement member 90. Then, the wire arrangement member 90 supports, with the wire fastening portions 902, the portion of the wire 91 at each of the opposite end portions of the plurality of terminal-equipped wires 9. Accordingly, the wire arrangement member 90 clamps the wires 91 using the wire fastening portions 902 at a number of positions that is twice the number of terminal-equipped wires 9.

The wire arrangement member transfer mechanism 1 includes a fixed seat 11 and a linear actuator 12. The fixed seat 11 is a portion that removably holds the wire arrangement member 90. The fixed seat 11 is provided with a wire arrangement member locking mechanism 111 that holds the wire arrangement member 90, and has a structure capable of releasing the holding. As the wire arrangement member locking mechanism 111, it is possible to use, for example, a well-known locking mechanism capable of holding a mating member using an engaging structure, and releasing the holding.

Note that the illustration of the wire arrangement member locking mechanism 111 has been omitted in FIG. 2.

In the following description, a direction in which the distal ends of the respective terminals 92 of the terminal-equipped wires 9 supported by the wire arrangement member 90 face in a state in which the wire arrangement member 90 is held by the fixed seat 11 is referred to as a "first direction". In the present embodiment, the first direction is a horizontal direction.

A direction extending along the arrangement direction of the fastening portions 902 under a situation where the wire arrangement member 90 is held by the fixed seat 11 is referred to as a "second direction". The second direction is orthogonal to the first direction. In the present embodiment, the second direction is also a horizontal direction. In the coordinate axis shown in the drawings, the X-axis positive direction is the first direction, and the Y-axis positive direction is the second direction.

Accordingly, the fixed seat 11 holds the wire arrangement member 90 in a state in which the distal ends of the respective terminals 92 of the terminal-equipped wires 9 supported by the wire arrangement member 90 face in the first direction, and where the arrangement direction of the wire fastening portion 902 extends along the second direction orthogonal to the first direction.

The linear actuator 12 moves the fixed seat 11 along the second direction, or in other words, along the Y-axis direction. By moving the fixed seat 11 along the second direction, the linear actuator 12 selectively positions each of the wire fastening portions 902 of the wire arrangement member 90 at a predefined origin position P0. The linear actuator 12 is, for example, a well-known ball screw-type electric actuator.

In a state in which the wire arrangement member 90 is held on the fixed seat 11, the position of each of the wire fastening portions 902, i.e., the position of each of the wires 91 fastened to the wire fastening portions 902 is known. For example, it is conceivable that a plurality of wire fastening portions 902 are arranged in a line at equal intervals from the reference position of the fixed seat 11. In this case, if the number indicating where the wire fastening portion 902 of interest is located from an end is designated, the amount of operation (the transfer direction and the transfer distance of the fixed seat 11) of the linear actuator 12 to move, to the origin position P0, the wire fastening portion 902 of interest and the wire 91 fastened thereto can be determined.

As shown in FIG. 2, the wire arrangement member transfer mechanism 1 can move the wire arrangement member 90 along the second direction over a range extending between a first retracted position A1 at which the entire wire arrangement member 90 is located removed from the origin position P0, and a first operating position A2 at which a part of the wire arrangement member 90 is located at the origin position P0.

The wire arrangement member 90 that supports end portions of the plurality of terminal-equipped wires 9, or in other words, a module of the wire arrangement member 90 is provided for each wiring module 200, for example.

In a step prior to the step executed by the terminal insertion device 100, the end portion of each of the terminal-equipped wires 9 is fastened to a wire fastening portion 902 of the wire arrangement member 90 either manually or by using another device. Then, the module of the wire arrangement member 90 is transported from the location at which another step is performed to the location of the terminal insertion device 100, and mounted to the wire arrangement member transfer mechanism 1.

FIG. 14 is a plan view of end portions of terminal-equipped wires 9 fastened to the wire arrangement member 90. As shown in FIG. 14, in the module of the wire arrangement member 90, variations may occur in the positions at which each of the wire fastening portions 902 clamps the wire 91 of the terminal-equipped wire 9. $\Delta \times 1$ and $\Delta \times 2$ in FIG. 14 indicate variations in the length of a portion of the end portion of the terminal-equipped wire 9 that bulges from the wire fastening portion 902.

Variations in the positions at which each of the wire fastening portions 902 clamps the wire 91 of the terminal-equipped wire 9 may be caused by, for example, variations occurring in a step of fastening the end portion of the terminal-equipped wire 9 to the wire fastening portion 902, or a positional shift resulting from an external force applied to the terminal-equipped wire 9 during transport of the wire arrangement member 90.

The variations in the positions at which each of the wire fastening portions 902 clamps the wire 91 lead to variations in the position of the end portion of the terminal-equipped wire 9 disposed at the origin position P0 by the wire arrangement member transfer mechanism 1. There may also be variations in the position of the wire 91 in the depth direction of the wire fastening portion 902. Further, depending on variations in the connection accuracy of the terminal 92 to the end portion of the wire 91, the terminal 92 may be slightly inclined relative to the longitudinal direction of the wire 91. Variations in such inclinations may also lead to variations in the position of the terminal 92.

As will be described later, the terminal insertion device 100 has the function of correcting such variations in the positions of the end portion of the terminal-equipped wire 9 before the terminal 92 of the terminal-equipped wire 9 reaches the cavity 81 of the connector 8.

In the following description, a region of the terminal-equipped wire 9 that extends from the terminal 92 to a portion of the wire 91 that is located near the terminal 92 is referred to as an "end portion region 900".

Connector Arrangement Member Transfer Mechanism

The connector arrangement member transfer mechanism 6 is a mechanism that moves the connector arrangement member 80, while removably holding the connector arrangement member 80. The connector arrangement member 80 includes a plurality of holders 82 respectively corresponding to a plurality of connectors 8 that are to be held. The holders 82 are supported in a state in which they are arranged in a line.

Each holder 82 is a member made of a resin or the like, and is formed in the shape of a quadrangular tube having a bottom portion. A holding recess 83 that is open on one side of the holder 82 is formed in the holder 82. The holding recess 83 is formed in a shape corresponding to the outside shape of the connector 8. The connector 8 is accommodated and held inside the holding recess 83 in a state in which the inlet of each of the cavities 81 faces the opening side of the holding recess 83. In this state, the connector 8 is held so as to be movable along the direction of insertion of the terminal 92 into the cavity 81 (also the direction of extension of the cavity 81). Note that the entire connector 8 may be accommodated inside the holding recess 83, or a portion of the connector 8 that is located on the inlet side of the cavity 81 may protrude outward from the opening of the holding recess 83.

Then, a connector 8 is accommodated and held in each of the above-described plurality of holders 82, and thereby, the plurality of connectors are supported in a state in which they are arranged in a line, and the inlets of the cavities 81 thereof face in the same direction. More specifically, the connector arrangement member 80 supports the plurality of connectors 8 in a state in which the inlets of the cavities 81 of the plurality of connectors 8 face in the same direction, and the arrangement direction of the connectors 8 is orthogonal to the direction in which the inlets of the cavities 81 face.

As described above, in order to stably insert the terminal 92 into the cavity 81, it is preferable to accurately hold the connector 8 at a constant position without rattling. To achieve this, the holder 82 needs to be accurately manufactured such that the shape of the holding recess 83 conforms with the outside shape of the connector 8. However, the manufacturing cost of the holder 82 is positively correlated with the accuracy required for the holder 82. Therefore, the manufacturing cost of the holder 82 increases if the holder 82 is to be manufactured accurately. In particular, the terminal insertion device 100 of the present embodiment uses a large number of holders 82, and therefore, an increase in the manufacturing cost of the individual holders 82 will result in a significant increase in the manufacturing costs of the terminal insertion device 100 as well. As a configuration for accurately positioning the connector 8 without relying on the accuracy of the holder 82, the terminal insertion device 100 of the present embodiment includes a push mechanism 1000 and a positioning portion 1010, which will be described later.

The connector arrangement member transfer mechanism 6 includes a fixed seat 61 and a linear actuator 62. The fixed seat 61 is a portion that removably holds the connector arrangement member 80. The fixed seat 61 is provided with a connector arrangement member locking mechanism 611 having a structure capable of holding the connector arrangement member 80 and releasing the holding. As the connector arrangement member locking mechanism 611, the same locking mechanism as the wire arrangement member locking mechanism 111 may be used, for example.

The fixed seat 61 removably holds the connector arrangement member 80 in a state in which the plurality of connectors 8 supported by the connector arrangement member 80 are arranged parallel to the arrangement direction of the wire fastening portion 902. In this case, the fixed seat 61 holds the connector arrangement member 80 in a state in which the plurality of connectors 8 are arranged along the second direction, and the inlets of the cavities 81 of the plurality of connectors 8 face in the opposite direction (X-axis negative direction) of the first direction.

The linear actuator 62 moves the fixed seat 61 along the second direction, or in other words, along the Y-axis direction. By moving the fixed seat 61 along the second direction, the linear actuator 62 selectively positions each of the cavities 81 of each of the connectors 8 supported by the connector arrangement member 80 at a predefined terminal insertion position P4. The linear actuator 62 is a well-known ball screw-type electric actuator, for example.

Consequently, the plurality of holders 82 are transported along a connector transport path extending along the second direction in a state in which the holders 82 are arranged. That is, the fixed seat 61 and the linear actuator 62 of the connector arrangement member transfer mechanism 6 are an example of a holder transport mechanism that transports the plurality of holders 82 along the connector transport path in a state in which the holders 82 are arranged.

The terminal insertion position P4 is a position in the second direction. The terminal insertion position P4 is a position that is aligned with a third relay position P3, which will be described later, in the second direction. That is, a coordinate P4y in the second direction that represents the terminal insertion position P4 coincides with the coordinate of the third relay position P3 in the second direction.

In a state in which the connector arrangement member 80 is held on the fixed seat 61, the positions of the cavities 81 of the connectors 8 are known. The positions of the cavities 81 on the connector arrangement member 80 are determined by the positions at which the connectors 8 are held on the fixed seat 61 and the shapes of the connectors 8.

For example, identification codes of the cavities 81 of the connectors 8 and data on the positions on the fixed seat 61 that respectively correspond to the identification codes are preset in the control portion 10. In this case, once the identification code of a cavity 81 of interest has been designated, the amount of operation (the transfer direction and the transfer distance of the fixed seat 61) of the linear actuator 62 to move the cavity 81 of interest to the terminal insertion position P4 is determined by referring to the data on the position in the second direction of the cavity 81 corresponding to the identification code.

Note that the cavity 81 of interest is a destination to which the terminal 92 is to be inserted, and is sequentially selected from the plurality of cavities 81 of the plurality of connectors 8 supported by the connector arrangement member 80. At the terminal insertion position P4, when the plurality of cavities 81 are formed so as to be arranged in a third direction, the cavity 81 of interest is one of the plurality of cavities 81 arranged along the third direction.

As shown in FIG. 2, the connector arrangement member transfer mechanism 6 can move the connector arrangement member 80 along the second direction over a range extending between a second retracted position A3 at which the entire connector arrangement member 80 is located removed from the terminal insertion position P4, and a second operating position A4 at which a part of the connector arrangement member 80 is located at the terminal insertion position P4.

As shown in FIG. 2, the direction of the first retracted position A1 as viewed from the first operating position A2 is the same as the direction of the second retracted position A3 as viewed from the second operating position A4. In the present embodiment, the second retracted position A3 is located in the first direction (X-axis positive direction) as viewed from the first retracted position A1.

The connector arrangement member 80, or in other words, a module of the connector arrangement member 80 that supports the plurality of connectors 8, is provided for each set of wiring modules 200, for example.

In a step prior to the step executed by the terminal insertion device 100, the plurality of connectors 8 are attached to the connector arrangement member 80 that has been produced in advance according to the specifications of the shape of the connectors 8. Then, the module of the connector arrangement member 80 is transported from the location of another step to the location of the terminal insertion device 100, and mounted to the connector arrangement member transfer mechanism 6.

Photosensor

The photosensor 7 is a transmissive optical sensor, and includes a light-emitting portion 71 and a light-receiving portion 72. The light-emitting portion 71 outputs detection light 73 along a plane orthogonal to a linear path RO passing through the origin position P0 as viewed from the third direction, which is orthogonal to the first direction and the second direction. The detection light 73 is light expanding in a sheet form along the plane.

Note that in the coordinate axis shown in the drawings, the Z-axis positive direction is the third direction. In the present embodiment, the third direction is a vertically upward direction.

The light-receiving portion 72 of the photosensor 7 receives the detection light 73. The photosensor 7 is a sensor that detects an object blocking the detection light 73 by detecting whether the detection level of the light-receiving portion 72 is less than a preset level. In the terminal insertion device 100, the photosensor 7 detects a distal end portion of the terminal 92 of the terminal-equipped wire 9 that is blocking the detection light 73.

Terminal Insertion Mechanism

The terminal insertion mechanisms 2 to 5 are mechanisms that insert the terminal 92 of each of the terminal-equipped wires 9 into a cavity 81 of interest located at the terminal insertion position P4. The terminal insertion mechanisms 2 to 5 clamp and move the end portion region 900 of the terminal-equipped wire 9, thus removing the end portion region 900 of the terminal-equipped wire 9 from the wire fastening portion 902 located at the origin position P0, and inserting the terminal 92 in the removed end portion region 900 of the terminal-equipped wire 9 into a cavity 81 of interest located at the terminal insertion position P4.

Here, for the sake of convenience, only the portion of the terminal insertion mechanisms 2 to 5 that clamps a part of the end portion region 900 of the terminal-equipped wire 9 is schematically illustrated in FIG. 2, and the illustration of the rest of the mechanisms has been omitted.

The terminal insertion mechanisms 2 to 5 include a first clamping portion 21 as a movement wire end portion holding portion, and a third direction transfer mechanism 22 as a wire end portion movement mechanism, which will be described later, and are used as mechanisms that move the end portion of the terminal-equipped wire 9 through the first clamping portion 21, and inserting the end portion into the cavity 81 of the connector 8.

First Clamping Portion-Associated Mechanism

The first clamping portion-associated mechanism 2 of the terminal insertion mechanisms 2 to 5 is a mechanism that moves the end portion region 900 of the terminal-equipped wire 9 by clamping a part of the end portion region 900, thus moving the end portion region 900 from the origin position P0 to a predefined first relay position P1.

The first clamping portion-associated mechanism 2 includes a first clamping portion 21, a third direction transfer mechanism 22, and a first direction transfer mechanism 23.

The first clamping portion 21 is a mechanism that clamps, from opposite sides along the second direction, a part of the end portion region 900 of the terminal-equipped wire 9 at the origin position P0 in a state in which the distal end of the terminal 92 faces in the first direction.

The first clamping portion 21 includes a pair of first opposing members 211, and a first approaching/separation actuator 212 that moves the pair of first opposing members 211 toward and away from each other along the second direction (Y-axis direction).

Each of the pair of first opposing members 211 includes a branched portion bifurcated from a basal portion. Then, the branched portions of the pair of first opposing members 211 clamp and support, at two opposite positions (i.e., portions of the end portion of the terminal-equipped wire 9 excluding the portion held by the wire fastening portion 902), the portion of the wire 91 of the terminal-equipped wire 9 that is clamped by the wire fastening portion 902. Preferably, the first clamping portion 21 clamps and supports a portion between a portion of the end portion of the terminal-equipped wire 9 that is held by the wire fastening portion 902, and a portion nipped by a pair of nipping portions, which will be described later. Here, of the two branched portions of each of the pair of first opposing members 211, the branched portion located in the X-axis positive direction clamps and supports the above-described portion.

The first approaching/separation actuator 212 moves the pair of first opposing members 211 toward or away from each other along the second direction. Consequently, the first approaching/separation actuator 212 switches the state of the pair of first opposing members 211 to one of a state of clamping the wire 91 and a state of releasing the clamping of the wire 91. The first approaching/separation actuator 212 is a solenoid actuator or a ball screw-type electric actuator, for example.

The third direction transfer mechanism 22 of the first clamping portion-associated mechanism 2 is a mechanism that moves the first clamping portion 21 along the third direction. The first direction transfer mechanism 23 of the first clamping portion-associated mechanism 2 is a mechanism that moves the first clamping portion 21 along the first direction.

The third direction transfer mechanism 22 and the first direction transfer mechanism 23 move the first clamping portion 21 along a plane passing through the origin position P0 and extending along the first direction and the third direction. Accordingly, the first relay position P1 is present in the plane passing through the origin position P0 and extending along the first direction and the third direction.

In the present embodiment, the third direction transfer mechanism 22 moves the first clamping portion 21 along the third direction, while directly supporting the first clamping portion 21, and the first direction transfer mechanism 23 moves the third direction transfer mechanism 22 along the first direction, while supporting the third direction transfer mechanism 22.

For example, the first direction transfer mechanism 23 includes a slide support portion 231 that supports the third direction transfer mechanism 22 so as to be movable along the first direction, and a linear actuator 232 that moves the third direction transfer mechanism 22 along the first direction. The third direction transfer mechanism 22 and the linear actuator 232 are well-known ball screw-type electric actuators, for example.

In the middle of an operation in which the third direction transfer mechanism 22 and the first direction transfer mechanism 23 move the end portion region 900 of the terminal-equipped wire 9 from the origin position P0 to the first relay position P1, the first direction transfer mechanism 23 moves the end portion region 900 of the terminal-equipped wire 9 along the linear path RO. More specific operations performed by the third direction transfer mechanism 22 and the first direction transfer mechanism 23 will be described later.

Note that the third direction transfer mechanism 22 and the first direction transfer mechanism 23 of the first clamping portion-associated mechanism 2 are an example of a first clamping portion transfer mechanism that moves the end portion region 900 of the terminal-equipped wire 9 to the first relay position P1 by moving the first clamping portion 21.

The above-described third direction transfer mechanism 22 is used as a wire end portion movement mechanism that moves the first clamping portion 21 between a position at which the end portion of the terminal-equipped wire 9 held by the wire fastening portion 902 can be held (lowered position) and another position (raised position). In particular, the third direction transfer mechanism 22 causes the first clamping portion 21 to advance or retract to or from the wire fastening portion 902 along the first direction (Z-axis direction), or in other words, a direction crossing the direction of extension (X-axis direction) of the terminal-equipped wire 9 held by the wire fastening portion 902 (here, the Z-axis direction, which is a direction orthogonal to the X-axis direction). Of course, the wire end portion movement mechanism may be inclined relative to the Z-axis direction so long as it causes the first clamping portion 21 to advance or retract in a direction crossing the X-axis direction.

Second Clamping Portion-Associated Mechanism

The second clamping portion-associated mechanism 3 of the terminal insertion mechanisms 2 to 5 is a mechanism that takes over the support of the end portion region 900 of the terminal-equipped wire 9 from the first clamping portion 21 at the first relay position P1. Further, after temporarily handing/taking over the support of terminal 92 of the terminal-equipped wire 9 to or from the third clamping portion 4, the second clamping portion-associated mechanism 3 hands over the terminal-equipped wire 9 to the fourth clamping portion-associated mechanism 5.

The second clamping portion-associated mechanism 3 includes a second clamping portion 31, a first direction transfer mechanism 32, and a second direction transfer mechanism 33.

The second clamping portion 31 clamps, from opposite sides along the second direction (Y-axis direction), a part of the terminal 92 and a part of the wire 91 in the end portion region 900 of the terminal-equipped wire 9 that are clamped by the first clamping portion 21 at the first relay position P1. Then, the second clamping portion 31 takes over the support of the end portion region 900 of the terminal-equipped wire 9 from the first clamping portion 21 at the first relay position P1.

The second clamping portion 31 includes a front second clamping portion 31a and a rear second clamping portion 31b. Each of the front second clamping portion 31a and the rear second clamping portion 31b includes a pair of second opposing members 311 and a second approaching/separation actuator 312 that moves the pair of second opposing members 311 toward or away from each other along the second direction (Y-axis direction).

The pair of second opposing members 311 of the front second clamping portion 31a clamp and support a part of the terminal 92 in the end portion region 900 of the terminal-equipped wire 9. On the other hand, the pair of second opposing members 311 of the rear second clamping portion 31b clamp and support a part of the wire 91 in the end portion region 900 of the terminal-equipped wire 9.

The second clamping portion 31 includes the front second clamping portion 31a and the rear second clamping portion 31b, and thus can separately perform operations of clamping the terminal 92 of the terminal-equipped wire 9 and releasing the clamping, and operations of clamping the wire 91 of the terminal-equipped wire 9 and releasing the clamping.

The second approaching/separation actuator 312 moves the pair of second opposing members 311 toward or away from each other along the second direction. Consequently, the second approaching/separation actuator 312 switches the state of the pair of second opposing members 311 to one of a state of clamping the end portion region 900 of the terminal-equipped wire 9 and a state of releasing the clamping of the end portion region 900. The second approaching/separation actuator 312 is a solenoid actuator or a ball screw-type electric actuator, for example.

The first direction transfer mechanism 32 of the second clamping portion-associated mechanism 3 is a mechanism that moves the second clamping portion 31 along the first direction. The second direction transfer mechanism 33 of the second clamping portion-associated mechanism 3 is a mechanism that moves the second clamping portion 31 along the second direction.

The first direction transfer mechanism 32 moves the second clamping portion 31 from the first relay position P1 to a predefined second relay position P2. The second direction transfer mechanism 33 moves the second clamping portion 31 from the second relay position P2 to a predefined third relay position P3. Further, the first direction transfer mechanism 32 and the second direction transfer mechanism 33 move the second clamping portion 31 from the third relay position P3 to the first relay position P1.

In the present embodiment, the first direction transfer mechanism 32 includes a slide support portion 321 that supports the second clamping portion 31 so as to be movable along the first direction, and a linear actuator 322 that moves the slide support portion 321 along the first direction.

Further, in the present embodiment, the second direction transfer mechanism 33 includes a slide support portion 331 that supports the second clamping portion 31 and the first direction transfer mechanism 32 so as to be movable along the second direction, and a linear actuator 332 that moves the slide support portion 331 along the second direction.

Third Clamping Portion

The third clamping portion 4 of the terminal insertion mechanisms 2 to 5 clamps, from opposite sides along the third direction at the predefined second relay position P2, a part of the terminal 92 in the end portion region 900 of the terminal-equipped wire 9 clamped by the second clamping portion 31. After temporarily taking over the support of the terminal 92 of the terminal-equipped wire 9 from the second clamping portion 31, the third clamping portion 4 hands over the support to the second clamping portion 31.

The third clamping portion 4 includes a pair of third opposing members 41, and a third approaching/separation actuator 42 that moves the pair of third opposing members 41 toward or away from each other along the third direction (Z-axis direction). In the present embodiment, the third clamping portion 4 is fixed.

The pair of third opposing members 41 clamp and support a part of the terminal 92 in the end portion region 900 of the terminal-equipped wire 9.

The third approaching/separation actuator 42 moves the pair of third opposing members 41 toward or away from each other along the third direction. Consequently, the third approaching/separation actuator 42 switches the state of the pair of third opposing members 41 to one of a state of clamping the terminal 92 of the terminal-equipped wire 9 and a state of releasing the clamping of the terminal 92. The third approaching/separation actuator 42 is a solenoid actuator or a ball screw-type electric actuator, for example.

Note that the first direction transfer mechanism 32 of the second clamping portion-associated mechanism 3 is an example of a mechanism for changing the positional relationship between the second and third clamping portions that moves at least one of the second clamping portion 31 and the third clamping portion 4 along the first direction.

That is, the first direction transfer mechanism 32 changes the positional relationship between the terminal 92 of the terminal-equipped wire 9 clamped by the second clamping portion 31 and the third clamping portion 4 between a first positional relationship and a second positional relationship. The first positional relationship is a positional relationship in which the third clamping portion 4 is separated from the terminal 92 in the first direction. The second positional relationship is a positional relationship in which the terminal 92 is located at the clamping position of the third clamping portion 4.

In the present embodiment, the positional relationship between the terminal 92 and the third clamping portion 4 is the first positional relationship when the end portion region 900 of the terminal-equipped wire 9 is located at the first relay position P1. The positional relationship between the terminal 92 and the third clamping portion 4 is the second positional relationship when the end portion region 900 of the terminal-equipped wire 9 is located at the second relay position P2.

Fourth Clamping Portion-Associated Mechanism

The fourth clamping portion-associated mechanism 5 of the terminal insertion mechanisms 2 to 5 is a mechanism that takes over the support of the end portion region 900 of the terminal-equipped wire 9 from the second clamping portion 31 at the predefined third relay position P3. Further, the fourth clamping portion-associated mechanism 5 inserts the terminal 92 of the terminal-equipped wire 9 into the cavity 81 of the connector 8 located at the terminal insertion position P4 by clamping and moving the end portion region 900 of the terminal-equipped wire 9.

The fourth clamping portion-associated mechanism 5 includes a fourth clamping portion 51, a third direction transfer mechanism 52, and a first direction transfer mechanism 53.

The fourth clamping portion 51 clamps, at the third relay position P3, a part of the terminal 92 and a part of the wire 91 in the end portion region 900 of the terminal-equipped wire 9 that is clamped by the second clamping portion 31 after it has taken over the support thereof from the third clamping portion 4. Then, the fourth clamping portion 51 takes over the support of the end portion region 900 of the terminal-equipped wire 9 from the second clamping portion 31 at the third relay position P3.

The fourth clamping portion 51 includes a front fourth clamping portion 51a and a rear fourth clamping portion 51b. Each of the front fourth clamping portion 51a and the rear fourth clamping portion 51b includes a fourth approaching/separation actuator 512 that respectively moves the pair of fourth opposing members 511 and the pair of fourth opposing members 511 toward or away from each other along the second direction (Y-axis direction).

The pair of fourth opposing members 511 of the front fourth clamping portion 51a clamp and support a part of the terminal 92 in the end portion region 900 of the terminal-equipped wire 9. On the other hand, the pair of fourth opposing members 511 of the rear fourth clamping portion 51b clamp and support a part of the wire 91 in the end portion region 900 of the terminal-equipped wire 9.

The fourth clamping portion 51 includes the front fourth clamping portion 51a and the rear fourth clamping portion 51b, and thus can separately perform operations of clamping the terminal 92 of the terminal-equipped wire 9 and releasing the clamping, and operations of clamping the wire 91 of the terminal-equipped wire 9 and releasing the clamping.

The fourth approaching/separation actuator 512 moves the pair of fourth opposing members 511 toward or away from each other along the second direction. Consequently, the fourth approaching/separation actuator 512 switches the state of the pair of fourth opposing members 511 to one of a state of clamping the end portion region 900 of the terminal-equipped wire 9 and a state of releasing the clamping of the end portion region 900. The fourth approaching/separation actuator 512 is a solenoid actuator or a ball screw-type electric actuator, for example.

The front fourth clamping portion 51a and the rear fourth clamping portion 51b are insertion wire end portion holding portions capable of holding the end portion of the terminal-equipped wire 9 during insertion of the terminal 92 into the cavity 81 of the connector 8.

The third direction transfer mechanism 52 of the fourth clamping portion-associated mechanism 5 is a mechanism that moves the fourth clamping portion 51 along the third direction. The third direction transfer mechanism 52 includes a front third direction transfer mechanism 52a that moves the front fourth clamping portion 51a along the third direction, and a rear third direction transfer mechanism 52b that moves the rear fourth clamping portion 51b along the third direction.

The third direction transfer mechanism 52 of the fourth clamping portion-associated mechanism 5 includes the front third direction transfer mechanism 52a and the rear third direction transfer mechanism 52b, and thus can separately perform an operation of moving the front fourth clamping portion 51a along the third direction, and an operation of moving the rear fourth clamping portion 51b along the third direction.

In the fourth clamping portion-associated mechanism 5, the third direction transfer mechanism 52 moves the fourth clamping portion 51 in the third direction (Z-axis positive direction) by an amount of difference in distance in the third direction between the known third relay position P3 and the known position of the cavity 81 of interest present at the terminal insertion position P4. Naturally, if the difference in distance is zero, the third direction transfer mechanism 52 will not move the fourth clamping portion 51.

Further, in the fourth clamping portion-associated mechanism 5, the first direction transfer mechanism 53 moves the fourth clamping portion 51 in the first direction (X-axis positive direction) by a distance corresponding to the sum of a difference in distance between the known third relay position P3 and the known position of the inlet of the cavity 81 of interest present at the terminal insertion position P4 in the first direction, and the depth dimension of the cavity 81 of interest.

The first direction transfer mechanism 53 is an insertion advance/retract driving portion that causes the front fourth clamping portion 51a and the rear fourth clamping portion 51b serving as the insertion wire end portion holding portions to advance or retract toward or from the cavity 81.

Through the operations of the third direction transfer mechanism 52 and the first direction transfer mechanism 53 described above, the terminal 92 of the terminal-equipped wire 9 is moved from the third relay position P3 and inserted into the cavity 81 of interest present at the terminal insertion position P4.

In the present embodiment, the third direction transfer mechanism 52 includes the slide support portion 321 that supports the second clamping portion 31 so as to be movable along the first direction, and the linear actuator 322 that moves the slide support portion 321 along the first direction.

In the present embodiment, the third direction transfer mechanism 52 moves the fourth clamping portion 51 along the third direction while directly supporting the fourth clamping portion 51, and the first direction transfer mechanism 53 moves the third direction transfer mechanism 52 along the first direction while supporting the third direction transfer mechanism 52.

For example, the first direction transfer mechanism 53 includes a slide support portion 531 that supports the third direction transfer mechanism 52 so as to be movable along the first direction, and a linear actuator 532 that moves the third direction transfer mechanism 52 along the first direction. The third direction transfer mechanism 52 and the linear actuator 532 are well-known ball screw-type electric actuators, for example.

Note that the third direction transfer mechanism 52 and the first direction transfer mechanism 53 of the fourth clamping portion-associated mechanism 5 are an example of a fourth clamping portion transfer mechanism that inserts the terminal 92 of the terminal-equipped wire 9 into each of the cavities 81 of each of the connectors 8 by moving the fourth clamping portion 51.

The second direction transfer mechanism 33 of the second clamping portion-associated mechanism 3 is an example of a second clamping portion transfer mechanism that moves the second clamping portion 31 along the second direction. The second direction transfer mechanism 33 moves the second clamping portion 31 between the second relay position P2 at which the second direction transfer mechanism 33 takes over the support of the terminal 92 from the third clamping portion, and a third relay position P3 at which the second direction transfer mechanism 33 hands over the support of the terminal-equipped wire 9 to the fourth clamping portion 51.

Note that when the holder 82 and the connector 8 have been moved to the terminal insertion position P4 by the connector arrangement member transfer mechanism 6, the terminal 92 is inserted into the cavity 81 of the connector 8 at the terminal insertion position P4 by the fourth clamping portion-associated mechanism 5.

Thus, in the present embodiment, the terminal insertion position P4 in the connector transport path is the position at which the terminal insertion mechanisms 2 to 5 insert the terminal into the cavity 81 of the connector 8 held by the holder 82. Then, a push mechanism 1000 and a positioning portion 1010 are provided at the terminal insertion position P4.

The push mechanism 1000 is provided at the terminal insertion position P4 on a side opposite to the terminal insertion mechanisms 2 to 5 relative to the holder 82. The push mechanism 1000 is configured to be able to push the connector 8 that is held inside the holding recess 83 of the holder 82 so as to protrude from the opening of the holding recess 83.

The positioning portion 1010 is provided at the terminal insertion position P4 on a side opposite to the terminal insertion mechanisms 2 to 5 relative to the holder 82. The positioning portion 1010 is configured to be able to receive and position the connector 8 at a position forward of the opening of the holding recess 83.

Then, when the connector 8 held inside the holding recess 83 of the holder 82 is pushed at the terminal insertion position P4 by the push mechanism 1000, a portion of the connector 8 that is located toward the inlet side of the cavity 81 protrudes from the opening of the holding recess 83, and is pushed against the positioning portion 1010. Consequently, the connector 8 is accurately positioned. The terminal is inserted by the terminal insertion mechanisms 2 to 5 into the cavity 81 of the connector 8 positioned in this manner by the positioning portion 1010. The configurations of the push mechanism 1000 and the positioning portion 1010 will be further described later.

Control Portion

The control portion 10 is a device that controls the actuators of the wire arrangement member transfer mechanism 1, the terminal insertion mechanisms 2 to 5, and the connector arrangement member transfer mechanism 6, while referring to a detection signal from the photosensor 7. Note that the illustration of the control portion 10 has been omitted in FIG. 2

The control portion 10 includes a calculation unit, a storage unit, and a signal interface. The calculation unit, the storage unit, and the signal interface are electrically connected to one another.

The calculation unit is an element or circuit including a CPU (Central Processing Unit) that executes processing for deriving control instructions to the actuators in accordance with a control program stored in advance in the storage unit.

The storage unit is a nonvolatile memory that stores the control program referred to by the calculation unit and other data. For example, the storage unit stores, in addition to the control program, data such as predetermined path transfer data, terminal-cavity correspondence data, wire position data, and cavity position data.

The predetermined path transfer data includes data indicating an operation procedure of the actuator of the first clamping portion-associated mechanism 2 for moving the end portion region 900 of the terminal-equipped wire 9 from the origin position P0 to the linear path RO along a predetermined path. Further, the predetermined path transfer data also includes data indicating an operation procedure of the actuator of the second clamping portion-associated mechanism 3 for moving the end portion region 900 from the position at which the terminal 92 is detected by the photosensor 7 to the third relay position P3 through the first relay position P1 and the second relay position P2 along a predetermined path.

The terminal-cavity correspondence data is data indicating a correspondence relation between the identification code of each of the wire fastening portions 902 of the wire arrangement member 90 that clamp the wire 91 and the identification code of each of the cavities 81 that indicates a cavity into which the terminal 92 is to be inserted. Further, the terminal-cavity correspondence data also indicates the order of the wire fastening portions 902 that are to be positioned to the origin position P0.

The wire position data includes data necessary for determining the position of each of the wire fastening portions 902 of the wire arrangement member 90. That is, the wire position data includes data necessary for determining the amount of operation of the linear actuator 12 of the wire arrangement member transfer mechanism 1 when each of the wire fastening portions 902 is moved to the origin position P0.

The cavity position data includes data necessary for determining the position and the depth dimension in each of the second direction (Y-axis direction) and the third direction (Z-axis direction) of each of the cavities 81 of each of the connectors 8 supported by the connector arrangement member 80. In this case, all of the positions of the inlets of the cavities 81 in the first direction (X-axis direction) are the same known position.

That is, the data on the position in the second direction of each of the cavities 81 in the cavity position data is data necessary for determining the amount of operation of the linear actuator 62 of the connector arrangement member transfer mechanism 6 when each of the cavities 81 of each of the connectors 8 supported by the connector arrangement member 80 is moved to the terminal insertion position P4.

The data on the position and the depth dimension in the third direction of each of the cavities 81 in the cavity position data is data necessary for determining the amount of operation of the third direction transfer mechanism 52 and the first direction transfer mechanism 53 of the fourth clamping portion-associated mechanism 5 when the terminal 92 of the terminal-equipped wire 9 is moved from the third relay position P3 to the cavity 81 of interest.

Upon receiving input of a detection signal from the light-receiving portion 72 of the photosensor 7, the signal interface transmits the detection signal to the calculation unit. Further, upon receiving input of a control instruction for each of the actuators that is derived by the calculation unit, the signal interface converts the control instruction into a drive signal for the actuator and outputs the drive signal.

Manufacturing Step of Wiring Module

Next, an example of the procedure executed by the terminal insertion device 100 will be described with reference to FIGS. 3 to 13. Of the steps of manufacturing a wiring module 200 including a plurality of terminal-equipped wires 9 and a plurality of connectors 8 connected to the end portions thereof, the terminal insertion device 100 performs a terminal insertion step of inserting the terminal 92 of each of the terminal-equipped wires 9 to the cavities 81 of each of the connectors 8.

Here, for the sake of convenience, only the portion of the terminal insertion mechanisms 2 to 5 that clamps a part of the end portion region 900 of the terminal-equipped wire 9 is schematically illustrated in FIGS. 3 to 13, and the illustrations of the rest of the mechanisms have been omitted. Further, the illustrations of the wire arrangement member transfer mechanism 1 and the connector arrangement member transfer mechanism 6 have been omitted in FIGS. 4 to 12. For the sake of convenience, regarding the first clamping portion 21, the second clamping portion 31, the third clamping portion 4, and the fourth clamping portion 51, the state in which the end portion region 900 of the terminal-equipped wire 9 is clamped is indicated by solid portions, and the state in which the clamping of the end portion region 900 of the terminal-equipped wire 9 is released is indicated by filled-in white portions.

The terminal insertion step includes an origin and terminal insertion positioning step, a clamping starting step, a first transfer primary step, a first transfer secondary step, a first take-over/hand-over step, a second transfer secondary step, a second take-over/hand-over step, a third transfer step, a third take-over/hand-over step, a fourth transfer primary step, and a fourth transfer secondary step.

Here, the mechanism operating in each of the steps operates in accordance with a control instruction from the calculation unit executing the control program stored in the storage unit in the control portion 10. At that time, the calculation unit of the control portion 10 causes the mechanisms to execute the above-described steps by outputting control signals to the mechanisms through the signal interface, while referring to various types of data stored in the storage unit and results of detection by the photosensor 7.

Prior to execution of each of the above-described steps, the module of the wire arrangement member 90 is fixed to the fixed seat 11 in a state in which the wire arrangement member transfer mechanism 1 disposes the fixed seat 11 at the first retracted position A1. Further, the module of the connector arrangement member 80 is fixed to the fixed seat 61 in a state in which the connector arrangement member transfer mechanism 6 disposes the second retracted position A3 at the fixed seat 61.

Origin and Terminal Insertion Positioning Step

The origin and terminal insertion positioning step includes an origin positioning step and a terminal insertion positioning step.

Figure 3:
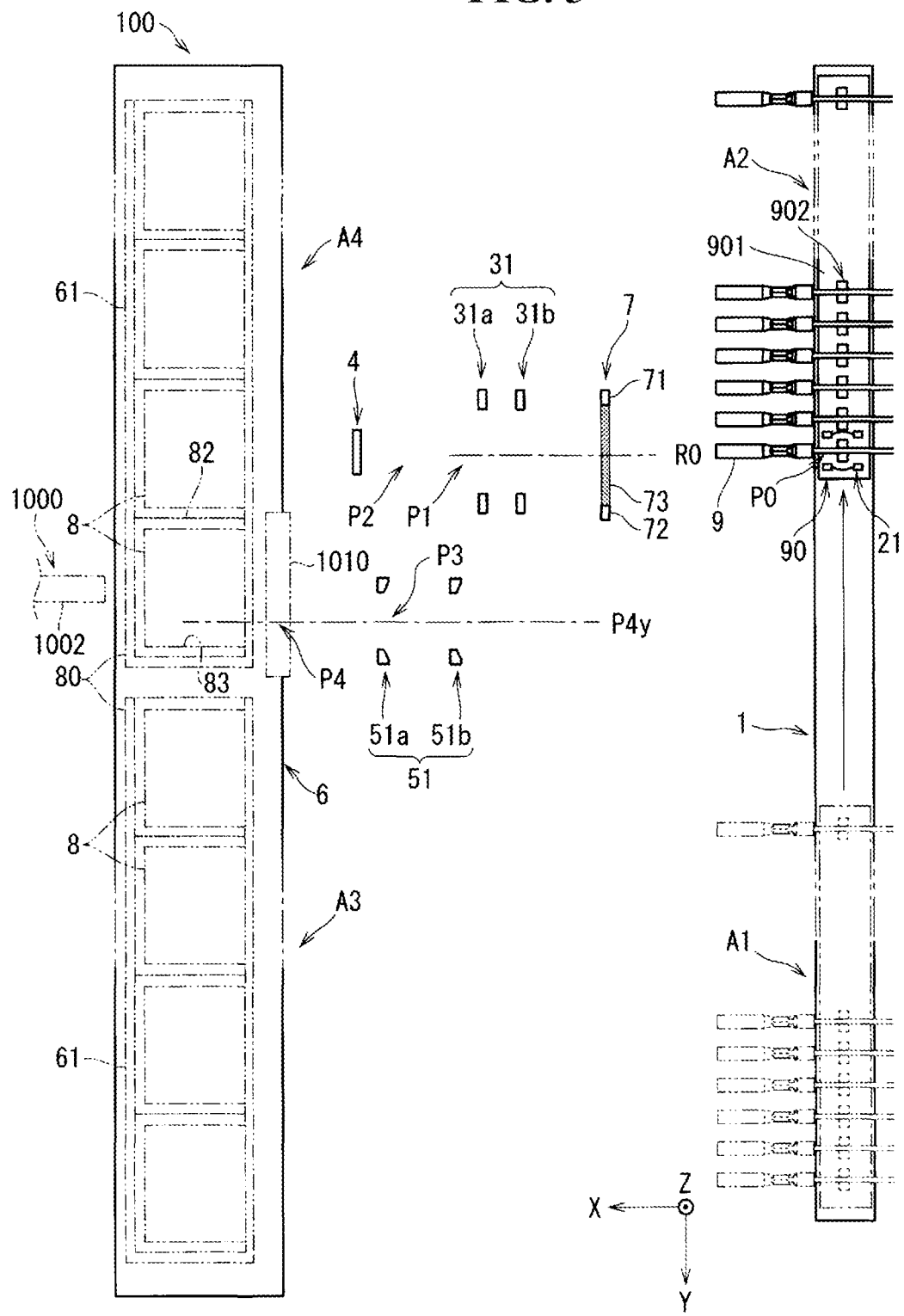
FIG. 3 is a schematic plan view of the terminal insertion device performing an operating position shifting step.

As shown in FIG. 3, the origin positioning step is a step in which the wire arrangement member transfer mechanism 1 selectively positions each of the wire fastening portion 902 of the wire arrangement member 90 at the origin position P0. In the present step, the control portion 10 sequentially specifies a wire fastening portion 902 of interest that is to be moved to the origin position P0, based on the terminal-cavity correspondence data in the storage unit.

Then, the wire fastening portion 902 of interest that has been specified by the control portion 10 is positioned at the origin position P0 by the wire arrangement member transfer mechanism 1 moving the wire arrangement member 90 along the second direction.

On the other hand, the terminal insertion positioning step is a step in which the connector arrangement member transfer mechanism 6 selectively positions each of the cavities 81 of each of the connectors 8 at the terminal insertion position P4 in the second direction by moving the connector arrangement member 80 along the second direction. In the present step, the control portion 10 sequentially specifies a cavity 81 of interest that is to be moved to the terminal insertion position P4, based on the terminal-cavity correspondence data in the storage unit.

Then, the cavity 81 of interest that has been specified by the control portion 10 is positioned at the terminal insertion position P4 by the connector arrangement member transfer mechanism 6 moving the connector arrangement member 80 along the second direction. Here, when the previous cavity 81 of interest and the current cavity 81 of interest are arranged along the third direction, the connector arrangement member transfer mechanism 6 does not move the connector arrangement member 80 in the present step.

For example, the origin positioning step and the terminal insertion positioning step are executed in parallel. Alternatively, these steps may be executed sequentially.

Each time the control portion 10 sequentially specifies a wire fastening portion 902 of interest, the origin and terminal insertion positioning step is executed. Then, each time the origin and terminal insertion positioning step is executed, a clamping starting step, a first transfer primary step, a first transfer secondary step, a first take-over/hand-over step, a second transfer secondary step, a second take-over/hand-over step, a third transfer step, a third take-over/hand-over step, a fourth transfer primary step, and a fourth transfer secondary step, which will be described later, are executed.

The step shown in FIG. 3 is the initial origin and terminal insertion positioning step, and this step is also an operating position shifting step.

As shown in FIG. 3, the operating position shifting step includes a first operating position shifting step in which the wire arrangement member transfer mechanism 1 moves the wire arrangement member 90 that supports the end portion regions 900 of the plurality of terminal-equipped wires 9 from the first retracted position A1 to the first operating position A2.

Further, the operating position shifting step also includes a second operating position shifting step in which the connector arrangement member transfer mechanism 6 moves the connector arrangement member 80 that supports the plurality of connectors 8 from the second retracted position A3 to the second operating position A4.

For example, the first operating position shifting step and the second operating position shifting step are executed in parallel. Alternatively, these steps may be executed sequentially.

Clamping Starting Step

Figure 4:
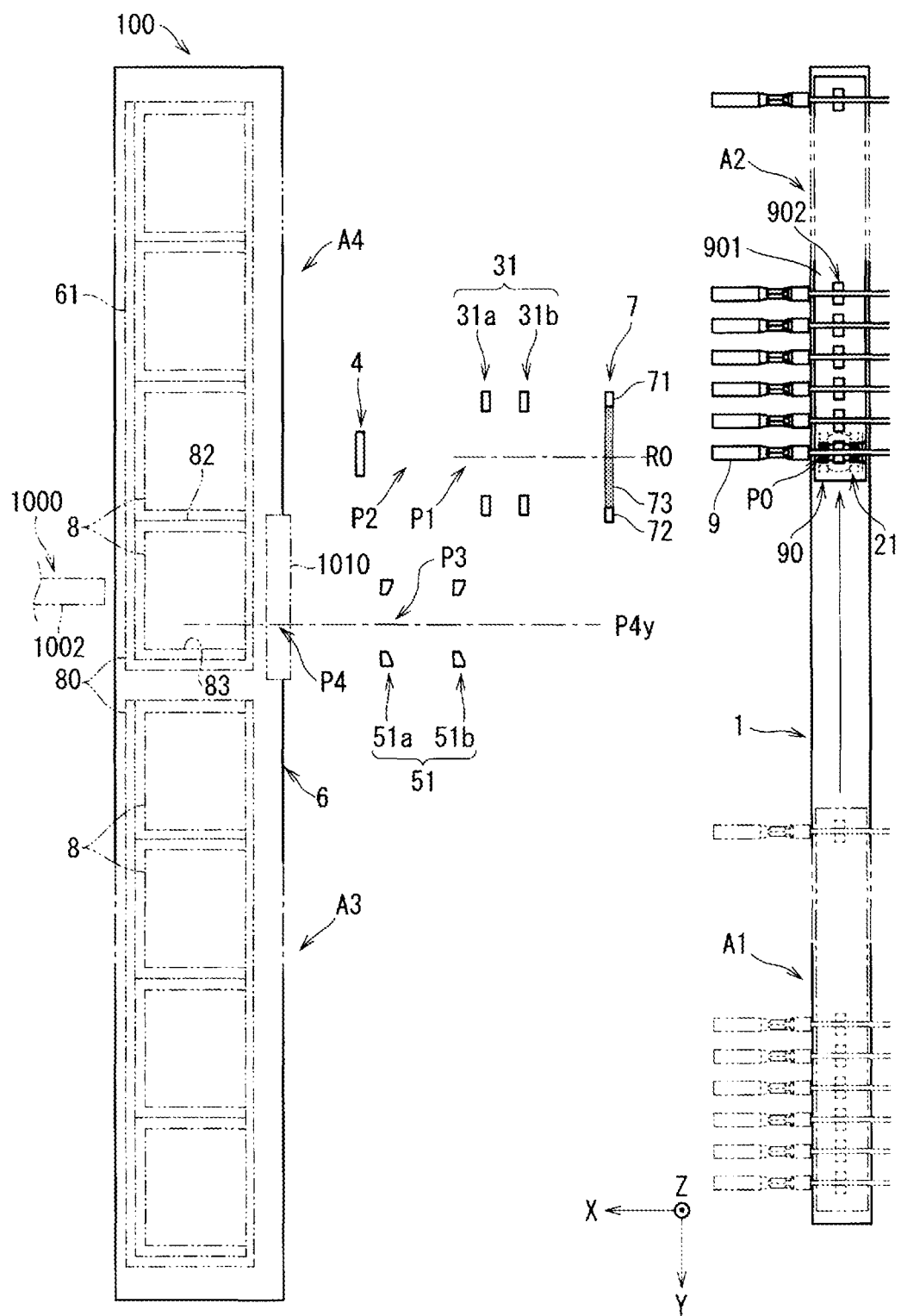
FIG. 4 is a schematic plan view of the terminal insertion device performing a clamping starting step.

As shown in FIG. 4, the clamping starting step is a step in which the first clamping portion 21 clamps, at the predefined origin position P0, a part of the end portion region 900 of the terminal-equipped wire 9 in a state in which the distal end of the terminal 92 faces in the first direction. In the present embodiment, the first clamping portion 21 clamps, at two positions, the wire 91 in the end portion region 900 of the terminal-equipped wire 9 from opposite sides along the second direction.

The two locations of the wire 91 that are clamped by the first clamping portion 21 are two locations on opposite sides of the portion clamped by the wire fastening portion 902. Consequently, when the first clamping portion 21 that clamps the wire 91 is moved in the third direction, the wire 91 is likely to be smoothly removed from the wire fastening portion 902 without being bent.

First Transfer Primary Step

Figure 5:
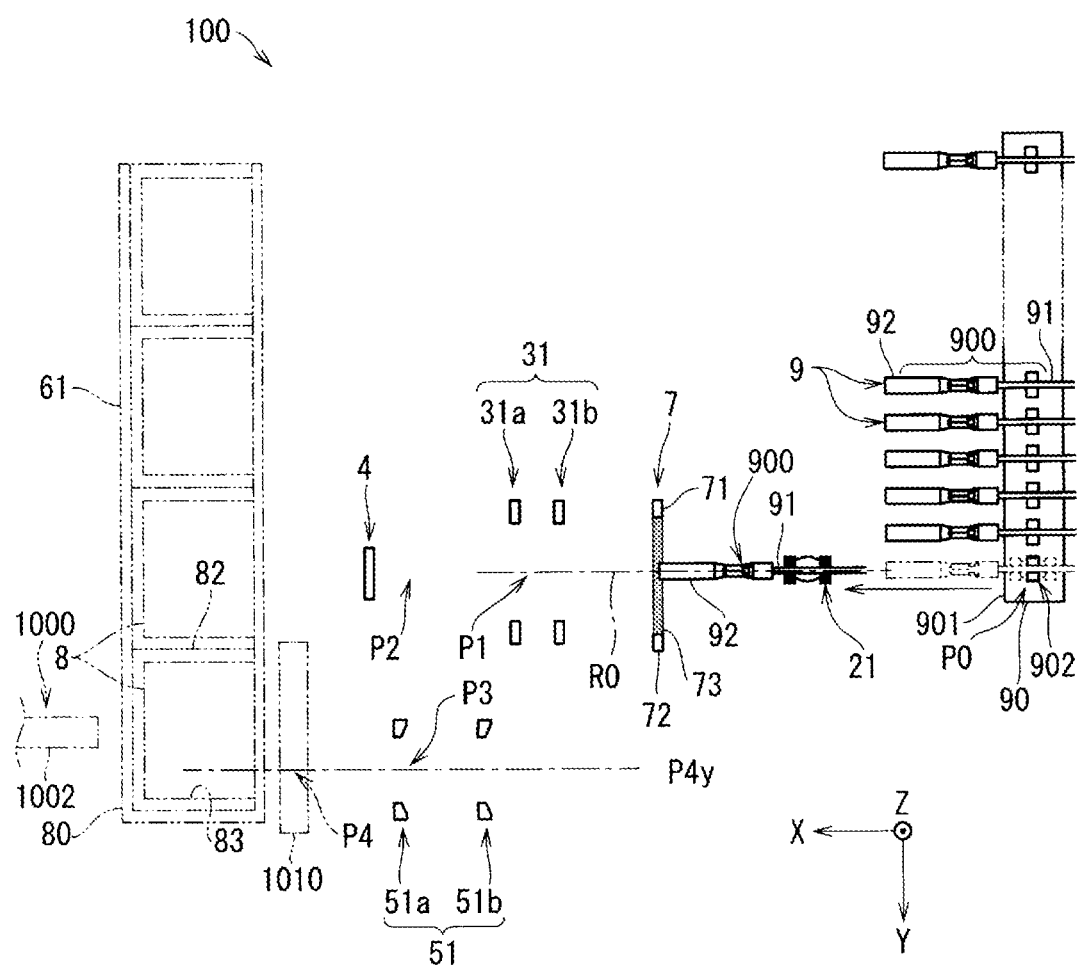
FIG. 5 is a schematic plan view of the terminal insertion device performing a first transfer primary step.

As shown in FIG. 5, the first transfer primary step is a step in which the first direction transfer mechanism 23 of the first clamping portion-associated mechanism 2 moves the first clamping portion 21 in the first direction along the linear path RO after the third direction transfer mechanism 22 of the first clamping portion-associated mechanism 2 has moved the first clamping portion 21 in the third direction by a predefined distance.

In the present step, when the first direction transfer mechanism 23 moves the first clamping portion 21 in the first direction along the predetermined linear path RO, and the photosensor 7 detects the distal end portion of the terminal 92 in mid-way through the movement, the step executed by the first direction transfer mechanism 23 and the third direction transfer mechanism 22 proceeds to the next first transfer secondary step.

For example, in the present step, the first direction transfer mechanism 23 of the first clamping portion-associated mechanism 2 moves the first clamping portion 21 along the predetermined linear path RO by a predefined first distance at a first speed. Here, the first distance is set within a range in which the terminal 92 does not reach the detection light 73, regardless of variations in the initial position of the terminal-equipped wire 9. Subsequently, the first direction transfer mechanism 23 moves the first clamping portion 21 along the predetermined linear path RO at a second speed that is slower than the first speed until the photosensor 7 detects the distal end portion of the terminal 92.

The above-described operation prevents an increase that is beyond being negligible in the positioning error of the terminal 92 owing to a delay in the feedback control that controls the first direction transfer mechanism 23 in accordance with a result of detection by the photosensor 7. Furthermore, the above-described operation increases the speed of transferring the terminal-equipped wire 9 while suppressing the positioning error of the terminal 92, thus shortening the execution time of the step.

Note that, when at least the first transfer primary step is being executed, a step in which the photosensor 7 detects an object (the distal end portion of the terminal 92) that is blocking the detection light 73 is executed.

First Transfer Secondary Step

Figure 6:
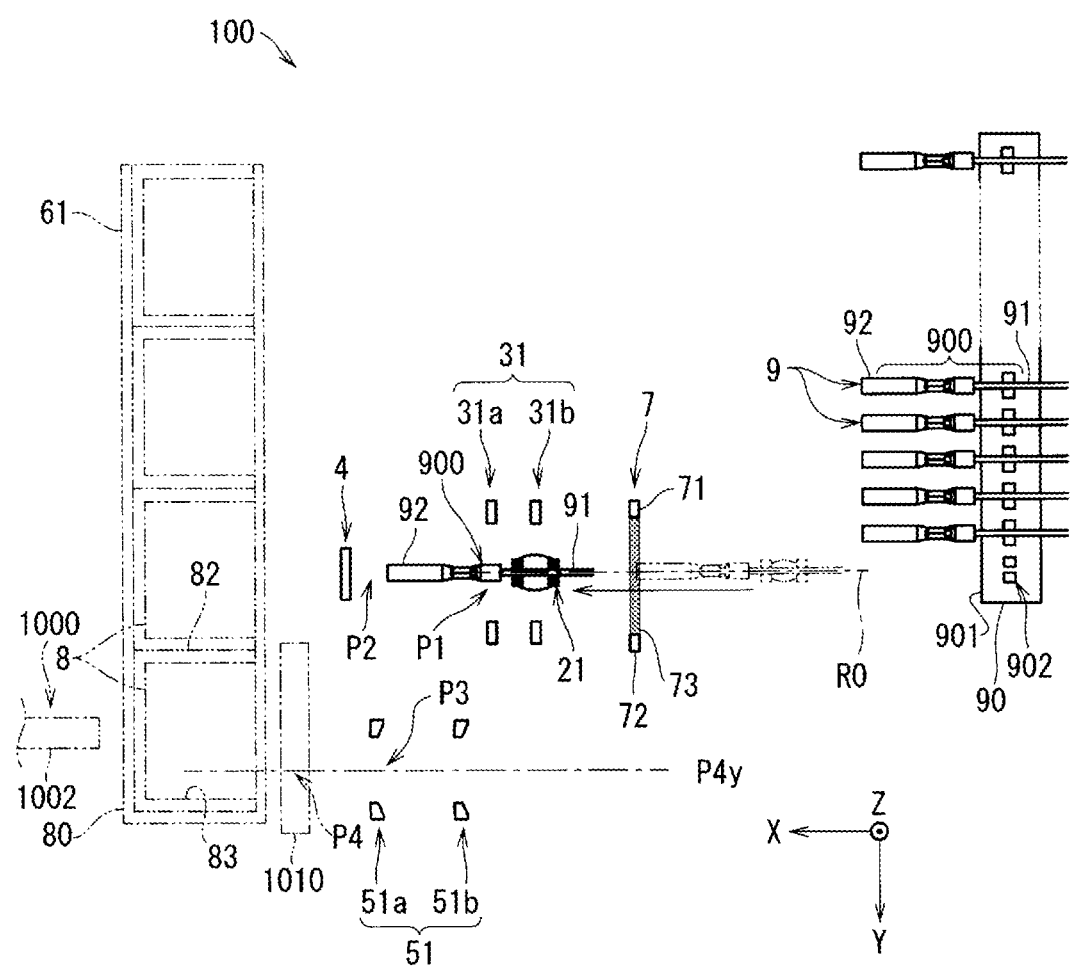
FIG. 6 is a schematic plan view of the terminal insertion device performing a first transfer secondary step.

As shown in FIG. 6, the first transfer secondary step is a step in which the third direction transfer mechanism 22 of the first clamping portion-associated mechanism 2 moves the first clamping portion 21 in the opposite direction (Z-axis negative direction) of the third direction by a predefined distance after the first direction transfer mechanism 23 of the first clamping portion-associated mechanism 2 has moved the first clamping portion 21 in the first direction along the linear path RO by a predefined distance from the point in time when the photosensor 7 has detected the terminal 92. Through the present step, the end portion region 900 of the terminal-equipped wire 9 is moved to the first relay position P1.

First Take-Over/Hand-Over Step

Figure 7:
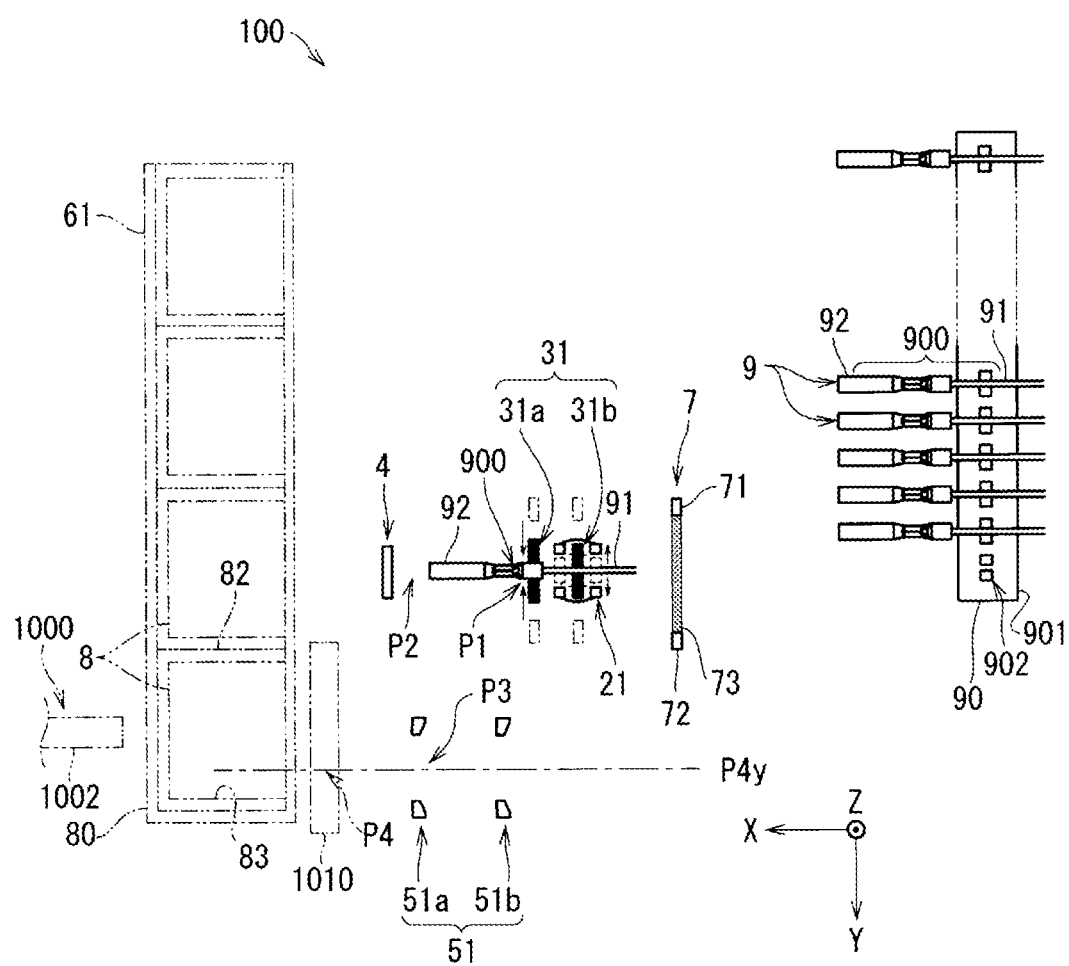
FIG. 7 is a schematic plan view of the terminal insertion device performing a first take-over/hand-over step.

As shown in FIG. 7, the first take-over/hand-over step is a step in which the second clamping portion 31 clamps, at the first relay position P1, a part of the terminal 92 and a part of the wire 91 in the end portion region 900 of the terminal-equipped wire 9 that are clamped by the first clamping portion 21 from opposite sides along the second direction.

Further, in the present step, the first clamping portion 21 releases the clamping of the wire 91. Consequently, the second clamping portion 31 takes over the support of the terminal-equipped wire 9 from the first clamping portion 21.

Figure 8:
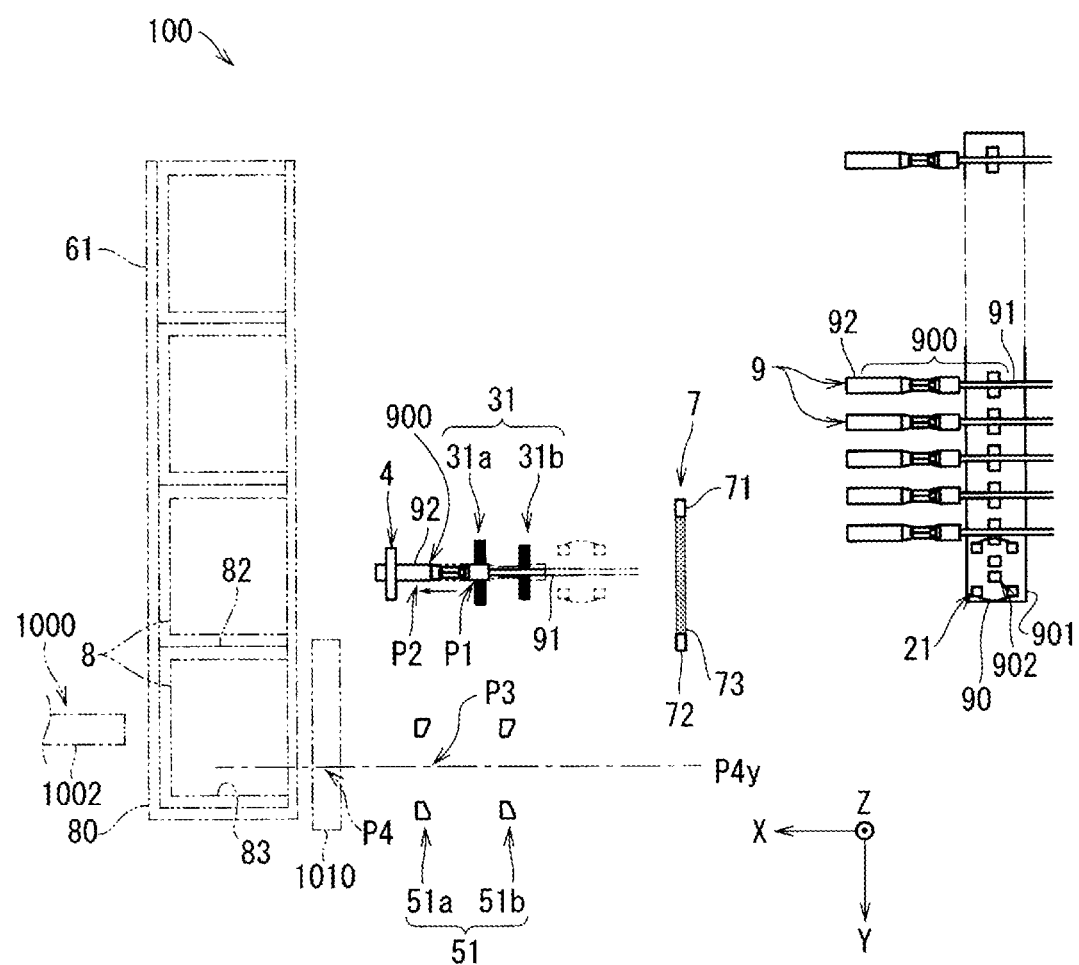
FIG. 8 is a schematic plan view of the terminal insertion device performing a second transfer secondary step.

As shown in FIG. 8, the second transfer secondary step is a step in which the first direction transfer mechanism 32 of the second clamping portion-associated mechanism 3 moves the second clamping portion 31 in the first direction by a predefined distance. In the present step, the first direction transfer mechanism 32 moves the end portion region 900 of the terminal-equipped wire 9 from the first relay position P1, which is separated from the third clamping portion 4, to the second relay position P2, which is the clamping position of the third clamping portion 4.

Second Take-Over/Hand-Over Step

Figure 9:
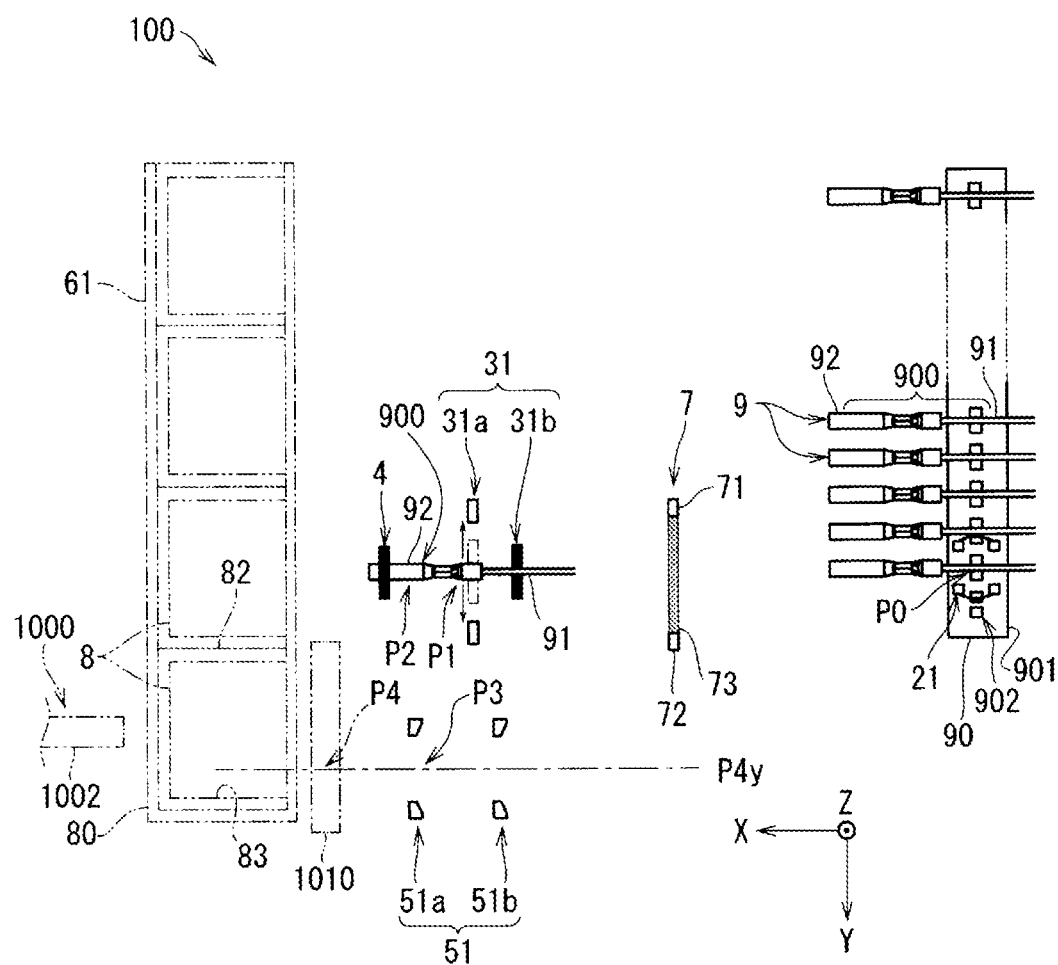
FIG. 9 is a schematic plan view of the terminal insertion device performing a second take-over/hand-over step.

As shown in FIG. 9, the second take-over/hand-over step is a step in which the third clamping portion 4 temporarily clamps, at the second relay position P2, a part of the terminal 92 of the end portion region 900 of the terminal-equipped wire 9 clamped by the second clamping portion 31 from opposite sides along the third direction.

Further, in the present step, the front second clamping portion 31a temporarily releases the clamping of the terminal 92 when the third clamping portion 4 clamps the terminal 92, and clamps the terminal 92 again. That is, the third clamping portion 4 hands over the support of the terminal 92 of the terminal-equipped wire 9 to the second clamping portion 31 after temporarily taking over the support from the second clamping portion 31.

Note that in the present step, it is possible that the rear second clamping portion 31b temporarily releases the clamping of the wire 91 when the third clamping portion 4 clamps the terminal 92, and clamps the wire 91 again, as in the case of the front second clamping portion 31a.

Third Transfer Step

Figure 10:
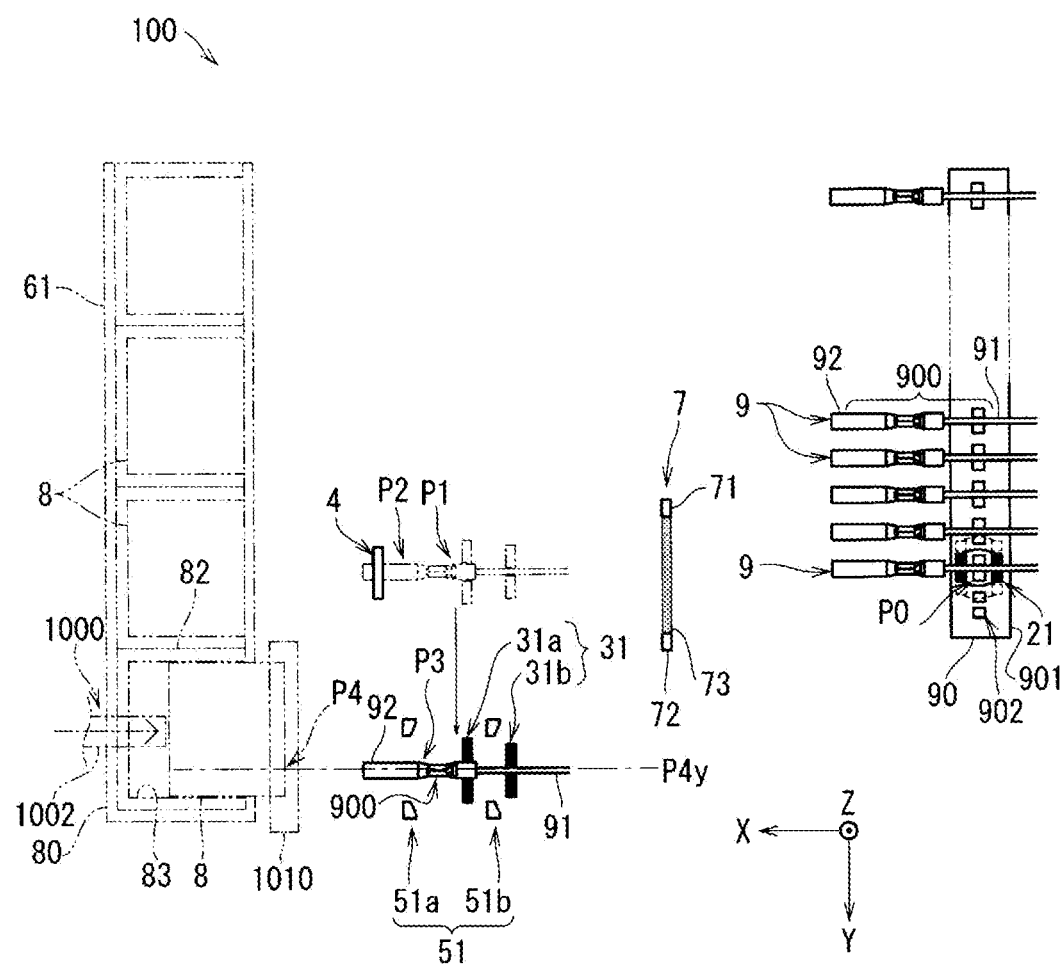
FIG. 10 is a schematic plan view of the terminal insertion device performing a third transfer step.

As shown in FIG. 10, the third transfer step is a step in which the second direction transfer mechanism 33 of the second clamping portion-associated mechanism 3 moves the second clamping portion 31 in the second direction by a predefined distance. Consequently, the second direction transfer mechanism 33 moves the second clamping portion 31 from the predetermined second relay position P2 to the predetermined third relay position P3. As described previously, the second relay position P2 is the position at which the second clamping portion 31 takes over the support of the terminal 92 from the third clamping portion 4, and the third relay position P3 is the position at which the second clamping portion 31 hands over the support of the terminal-equipped wire 9 to the fourth clamping portion 51.

Third Take-Over/Hand-Over Step

Figure 11:
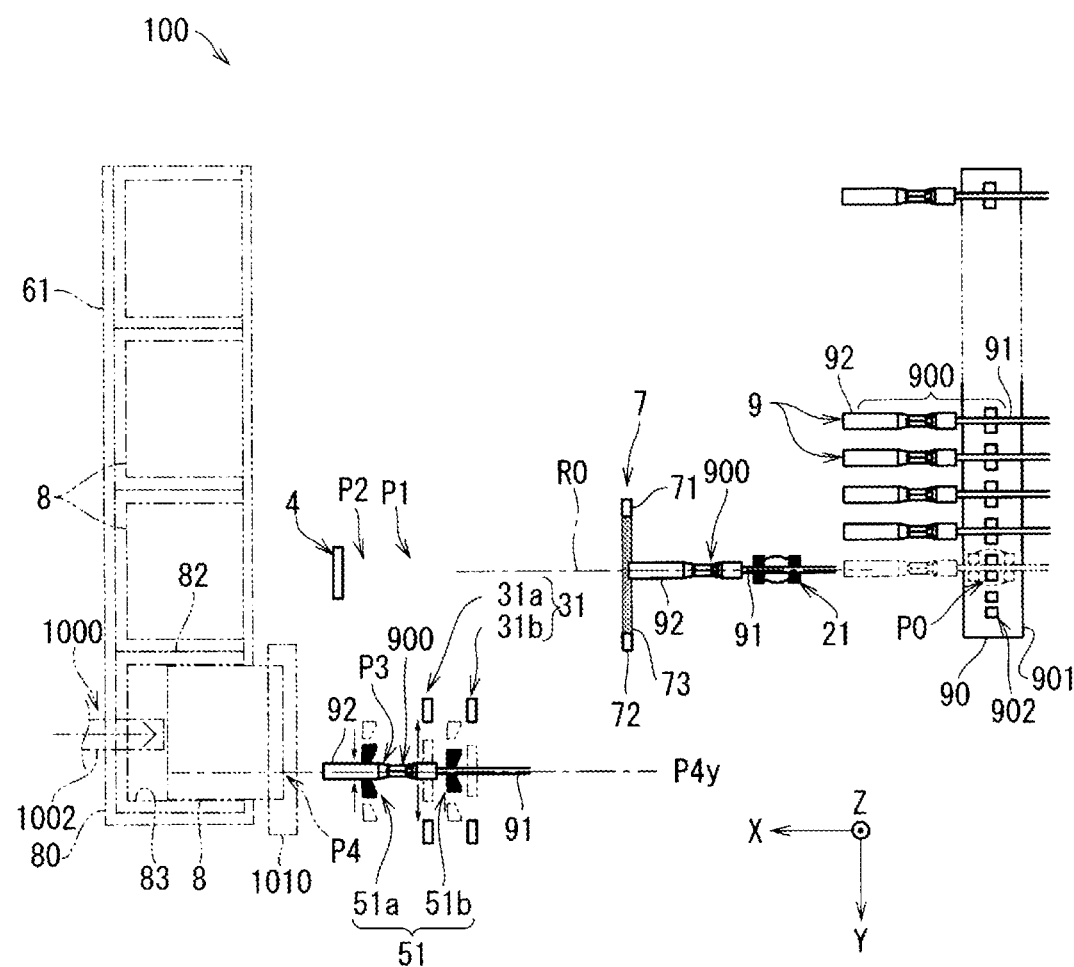
FIG. 11 is a schematic plan view of the terminal insertion device performing a third take-over/hand-over step.

As shown in FIG. 11, the third take-over/hand-over step is a step in which the fourth clamping portion 51 clamps, at the third relay position P3, a part of the terminal 92 and a part of the wire 91 in the end portion region 900 of the terminal-equipped wire 9 that is clamped by the second clamping portion 31 after taking over the clamping thereof from the third clamping portion 4.

Further, in the present step, the second clamping portion 31 releases the clamping of the end portion region 900 when the fourth clamping portion 51 clamps the end portion region 900 of the terminal-equipped wire 9. Consequently, the fourth clamping portion 51 takes over the support of the terminal-equipped wire 9 from the second clamping portion 31.

Fourth Transfer Primary Step

Figure 12:
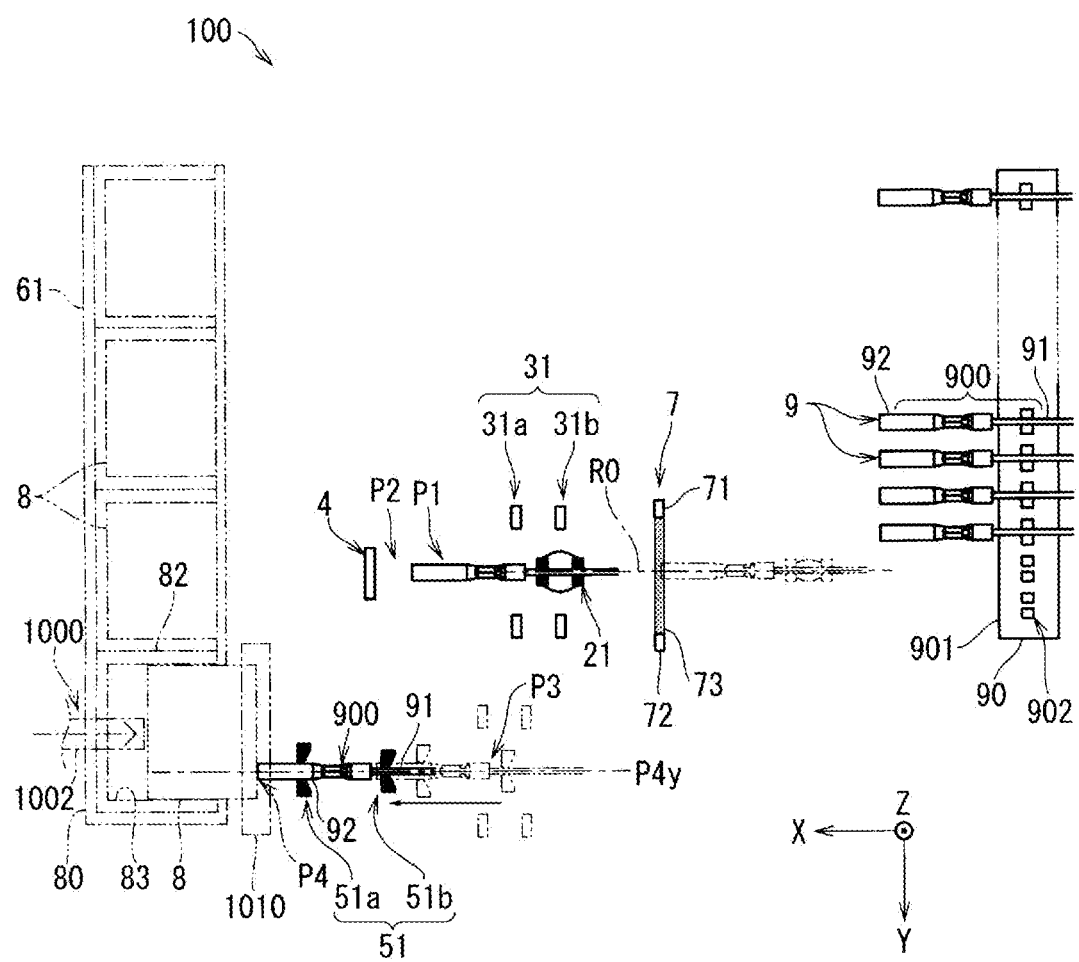
FIG. 12 is a schematic plan view of the terminal insertion device performing a fourth transfer primary step.

As shown in FIG. 12, the fourth transfer primary step is a step in which the third direction transfer mechanism 52 and the first direction transfer mechanism 53 of the fourth clamping portion-associated mechanism 5 move the distal end portion of the terminal 92 of the terminal-equipped wire 9 from the third relay position P3 into the cavity 81 located at the terminal insertion position P4 by moving the fourth clamping portion 51.

In the present step, the third direction transfer mechanism 52 moves the fourth clamping portion 51 in the third direction (Z-axis positive direction) by a difference in distance in the third direction between the known third relay position P3 and the known position of the cavity 81 of interest. Naturally, if the difference in distance is zero, the third direction transfer mechanism 52 will not move the fourth clamping portion 51.

Furthermore, in the present step, the first direction transfer mechanism 53 of the fourth clamping portion-associated mechanism 5 moves the fourth clamping portion 51 in the first direction (X-axis positive direction) by a distance corresponding to a difference in distance in the first direction between the known third relay position P3 and the known position of the inlet of the cavity 81 of interest present at the terminal insertion position P4 (the position in a state where the connector 8 has been moved to the positioning portion 1010 side). Consequently, the distal end portion of the terminal 92 is inserted into the cavity 81 of interest.

As described above, in the fourth transfer primary step, the third direction transfer mechanism 52 and the first direction transfer mechanism 53 of the fourth clamping portion-associated mechanism 5 move the fourth clamping portion 51 in accordance with a movement procedure that is defined by a comparison between the third relay position P3 at which the fourth clamping portion 51 has taken over the support of the terminal-equipped wire 9 from the second clamping portion 31 and a preset position of the cavity 81 of each of the connectors 8.

Fourth Transfer Secondary Step

Figure 13:
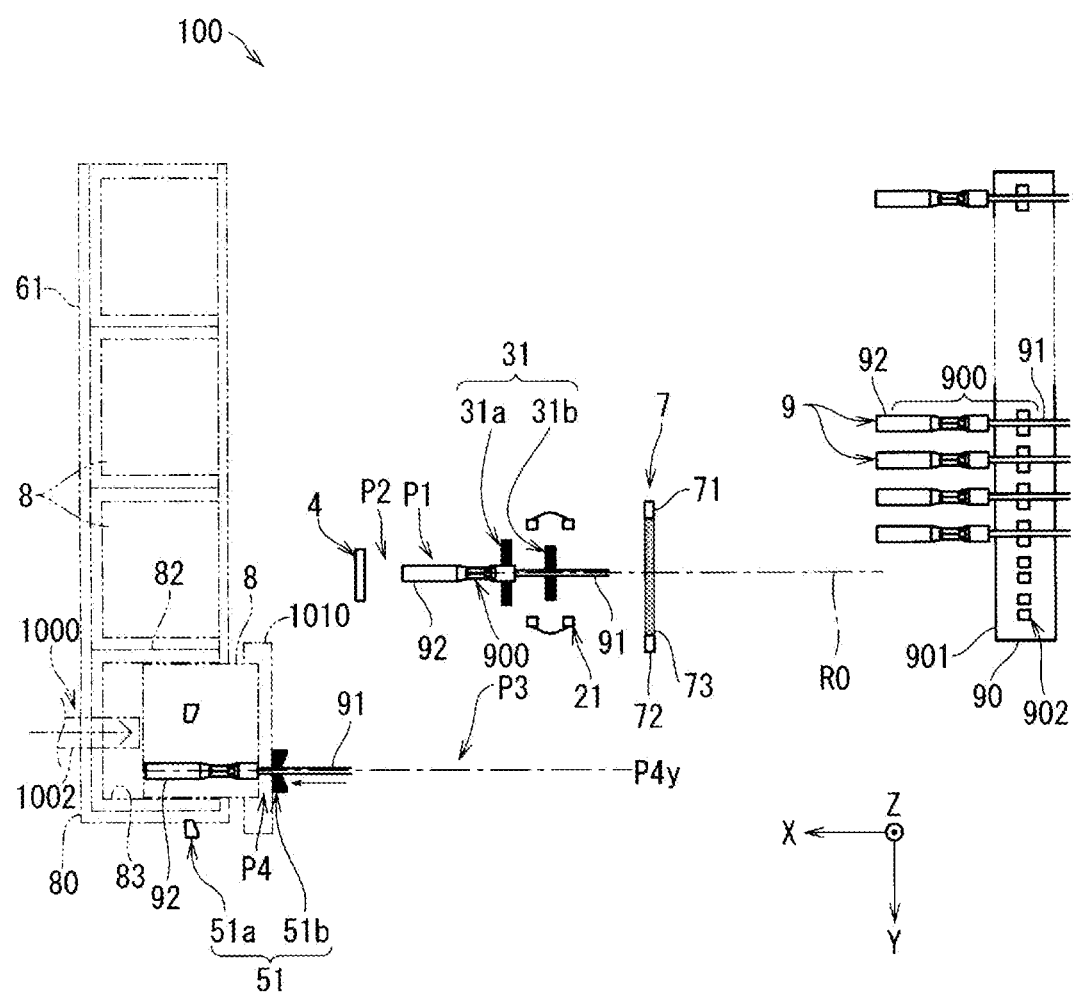
FIG. 13 is a schematic plan view of the terminal insertion device performing a fourth transfer secondary step.

As shown in FIG. 13, the fourth transfer secondary step is a step in which the first direction transfer mechanism 53 of the fourth clamping portion-associated mechanism 5 further moves the rear fourth clamping portion 51b in the first direction by a distance corresponding to the depth dimension of the cavity 81 of interest in a state in which the rear fourth clamping portion 51b clamps the wire 91 in the end portion region 900.

In the present step, the front fourth clamping portion 51a releases the clamping of the terminal 92, and the front third direction transfer mechanism 52a of the fourth clamping portion-associated mechanism 5 moves the front fourth clamping portion 51a in the third direction to a position at which the front fourth clamping portion 51a does not interfere with the connector 8.

Positioning Step

A positioning step is performed in a fourth transfer step including the fourth transfer primary step and the fourth transfer secondary step described above.

That is, the connector 8 is held by the holder 82 at the terminal insertion position P4. Then, the connector 8 inside the holder 82 is pushed by the push mechanism 1000. Consequently, the connector 8 is moved toward the fourth clamping portion-associated mechanism 5 such that the connector 8 protrudes on the opening side of the holder 82. Then, a peripheral edge portion of the connector 8 on the inlet side of the cavity 81 is pushed against the positioning portion 1010. Consequently, the connector 8 is accurately positioned at a constant position, regardless of the processing accuracy of the holding recess 83 of the holder 82. For the cavity 81 of the connector 8 positioned by the positioning portion 1010 in this manner, insertion of the terminal 92 is performed in the fourth transfer primary step and the fourth transfer secondary step.

As a result of the terminal insertion device 100 executing the above-described steps, a terminal 92 of the terminal-equipped wire 9 is inserted into the cavity 81 of the connector 8. Then, the terminal insertion device 100 repeats execution of each of the steps described above until insertion of terminals 92 into the cavities 81 of each of the plurality of connectors 8 supported by the connector arrangement member 80 is complete.

Upon completion of insertion of terminals 92 into the cavities 81 of each of the plurality of connectors 8 supported by the connector arrangement member 80, the connector arrangement member transfer mechanism 6 moves the connector arrangement member 80 from the second operating position A4 to the second retracted position A3. Further, the wire arrangement member transfer mechanism 1 moves the wire arrangement member 90 from the first operating position A2 to the first retracted position A1.

Then, at the first retracted position A1 and the second retracted position A3, replacement of the wire arrangement member 90 and the connector arrangement member 80 is performed. The connector arrangement member 80 that has been removed from the connector arrangement member transfer mechanism 6 at the second retracted position A3 collectively supports a set of wire harnesses or a plurality of connectors 8 constituting a set of sub-wire harnesses in a state in which the terminal 92 of the terminal-equipped wire 9 is inserted.

The connector arrangement member 80 that has been removed at the second retracted position A3 is transported to the location at which the next step is performed while supporting the plurality of connectors 8 into each of which a terminal 92 of an terminal-equipped wire 9 has been inserted.

By repeating the foregoing steps, a wiring module 200 is manufactured that includes a plurality of terminal-equipped wires 9 and a plurality of connectors 8, and that is integrated in a state in which the terminals 92 of the plurality of terminal-equipped wires 9 are inserted into the cavities 81 of the connectors 8, as shown in FIG. 15.

Details of Positioning of Connector

Figure 16:
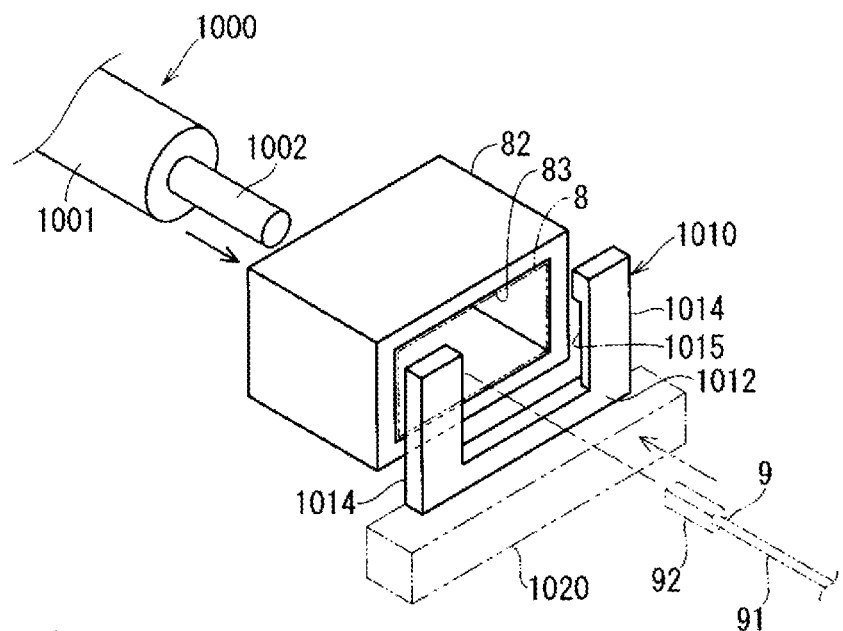
FIG. 16 is a schematic perspective view showing a holder, a push mechanism, and a positioning portion.
Figure 17:
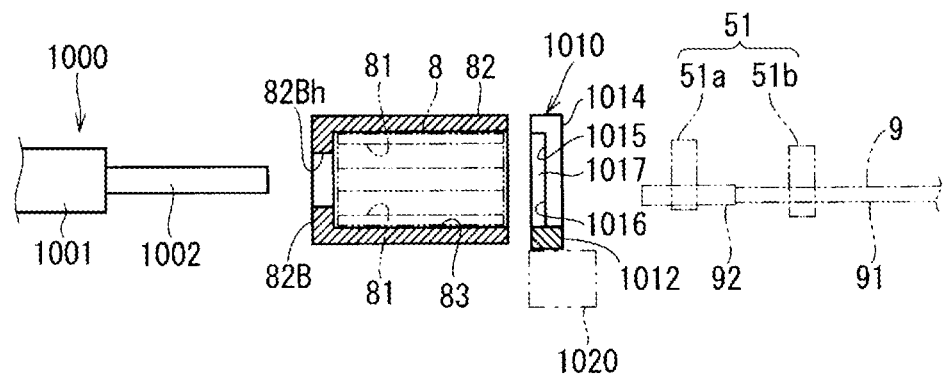
FIG. 17 is a schematic cross-sectional view showing the holder, the push mechanism, and the positioning portion.

The configuration for positioning the connector 8 will be described in further detail. The terminal insertion device 100 of the present embodiment includes the push mechanism 1000 and the positioning portion 1010 as the configurations for more accurately positioning the connector 8 at the terminal insertion position P4. FIG. 16 is a schematic perspective view showing the holder 82, the push mechanism 1000, and the positioning portion 1010 that are located at the terminal insertion position P4, and FIG. 17 is a schematic cross-sectional view thereof.

The holder 82 is formed in the shape of a quadrangular tube having a bottom portion 82B. A holding recess 83 that is open on a side opposite to the bottom portion 82B is formed in the holder 82. The holding recess 83 is formed in the same shape as the outer peripheral shape surrounding the plurality of cavities 81 of the connector 8. Accordingly, the connector 8 can be accommodated inside the holding recess 83 in a state in which the direction of extension of the cavities 81 is made to coincide with the depth direction of the holding recess 83. The depth dimension of the holding recess 83 is set to be the same as or smaller than the length dimension of the connector 8 in the direction of extension of the cavities 81. Accordingly, at least a portion of the connector 8 that is located on a side opposite to the inlet of the cavity 81 can be accommodated inside the holding recess 83. Preferably, the entire connector 8 is accommodated inside the holding recess 83. The holding recess 83 is configured to have the same inner peripheral shape that is continuous from the opening toward the bottom portion 82B, for example. Accordingly, the connector 8 can be moved along the direction of extension of the cavity 81 (coincides with the direction of insertion of the terminal 92 into the cavity 81) in a state in which the connector 8 is accommodated inside the holding recess 83.

In a state in which the holder 82 is located at the terminal insertion position P4, the opening of the holding recess 83 faces the fourth clamping portion-associated mechanism 5 side at the coordinate P4y. Accordingly, the inlet of any of the cavities 81 of the connector 8 held inside the holding recess 83 faces toward the fourth clamping portion-associated mechanism 5 at the coordinate P4y.

A pushing hole portion 82Bh is formed in a portion of the holder 82 that is located on a side opposite to the opening, or in other words, the bottom portion 82B. Although the pushing hole portion 82Bh is preferably, but is not necessarily, formed at the center of the bottom portion 82B. The pushing hole portion 82Bh is formed to have a size that allows the pushing portion 1002 of the push mechanism 1000 to be pushed thereinto.

The push mechanism 1000 and the positioning portion 1010 are disposed at positions sandwiching the holder 82 located at the terminal insertion position P4. The push mechanism 1000 is provided on a side opposite to the fourth clamping portion-associated mechanism 5 relative to the holder 82 located at the terminal insertion position P4, and the positioning portion 1010 is provided on the fourth clamping portion-associated mechanism 5 side.

The push mechanism 1000 is formed by an air cylinder, a hydraulic cylinder, a ball screw-type electric actuator, or the like. The push mechanism 1000 includes a pushing body portion 1001 and a pushing portion 1002 capable of advancing or retracting to or from the pushing body portion 1001. The pushing portion 1002 is formed in a bar shape. The pushing body portion 1001 is supported at a constant position in an orientation in which the central axis of the pushing portion 1002 is made to coincide with the central axis of the pushing hole portion 82Bh and the distal end portion of the pushing portion 1002 faces the pushing hole portion 82Bh of the holder 82 that is located at the terminal insertion position P4. Under control by the control portion 10, the push mechanism 1000 drives the pushing portion 1002 to advance or retract. The advancing amount of the pushing portion 1002 is set to be such a magnitude that a portion of the connector 8 that is located on the inlet side of the cavities 81 can be pushed against the positioning portion 1010. Then, when the pushing portion 1002 is driven to advance, the distal end portion of the pushing portion 1002 protrudes from the bottom portion 82B of the holding recess 83 through the pushing hole portion 82Bh and is pushed against the connector 8 inside the holding recess 83. Consequently, the connector 8 is pushed to protrude from the opening of the holding recess 83, and the portion on the inlet side of the cavities 81 is pushed against the positioning portion 1010. When the pushing portion 1002 is driven to retract in this state, the connector 8 can be brought back into the holding recess 83 until it is abutted against the bottom portion 82B inside the holding recess 83.

As the timing for driving the pushing portion 1002 to advance and the timing for driving the pushing portion 1002 to retract, the following two modes are possible, for example.

The first mode is such that the timing for driving the pushing portion 1002 to advance is each timing before the fourth clamping portion-associated mechanism 5 inserts a terminal into each of the cavities 81, and the timing for driving the pushing portion 1002 to retract is each timing after the fourth clamping portion-associated mechanism 5 has completed insertion of a terminal into each of the cavities 81. That is, this is a mode in which the pushing portion 1002 is driven to advance or retract each time a terminal 92 is inserted into a cavity 81.

The second mode is such that the timing for driving the pushing portion 1002 to advance is each timing before the fourth clamping portion-associated mechanism 5 initially inserts a terminal 92 into the plurality of cavities 81 of a given connector 8, and the timing for driving the pushing portion 1002 to retract is each time after the fourth clamping portion-associated mechanism 5 has completed insertion of terminals 92 into all of the plurality of cavities 81 of a given connector 8 that are to be subjected to insertion. That is, this is a mode in which the pushing portion 1002 is driven to advance or retract for each given connector 8.

Figure 18:
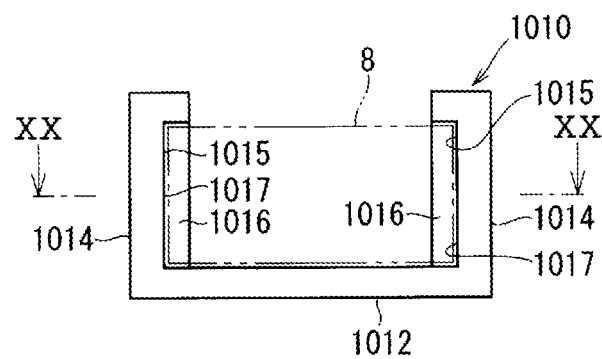
FIG. 18 is a schematic diagram in which the positioning portion is viewed from the holder side.
Figure 19:
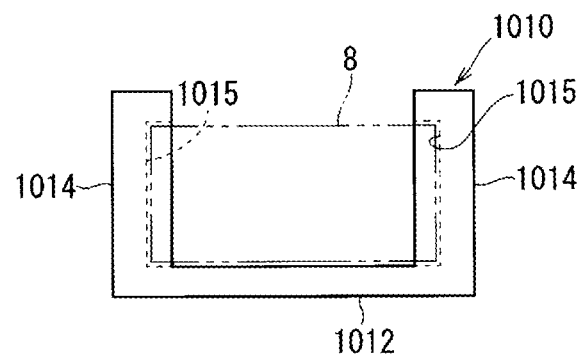
FIG. 19 is a schematic diagram in which the positioning portion is viewed from the side opposite to the holder.
Figure 20:
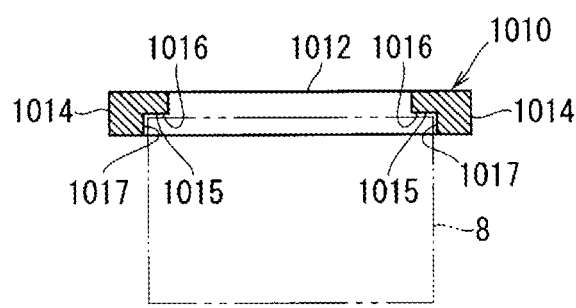
FIG. 20 is a schematic cross-sectional view taken along the line XX-XX in FIG. 18.
Figure 21:
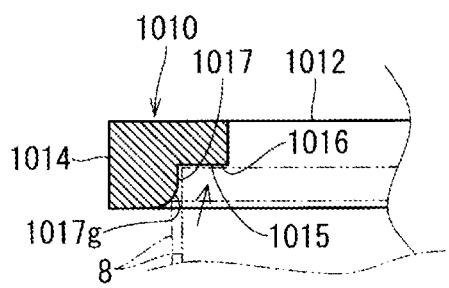
FIG. 21 is a partial enlarged view of FIG. 20.

FIG. 18 is a schematic diagram of the positioning portion 1010 as viewed from the holder 82 side, FIG. 19 is a schematic diagram of the positioning portion 1010 as viewed from the side opposite to the holder 82, FIG. 20 is a schematic cross-sectional view taken along the line XX-XX in FIG. 18, and FIG. 21 is a partial enlarged view of FIG. 20.

The positioning portion 1010 is configured to be able to receive and position the connector 8 at a position forward of the opening of the holding recess 83 of the holder 82.

The positioning portion 1010 is a member made of a metal or the like, and includes first positioning portions 1016 that abut against a portion of the connector 8 that is located on the side where the terminal 92 is inserted (the inlet side surface of the cavity 81), and second positioning portions 1017 that abut against opposite side portions of the connector 8.

More specifically, the positioning portion 1010 is a member formed, for example, by cutting a metal plate, and includes a bottom-side coupling portion 1012 and a pair of side portions 1014.

The bottom-side coupling portion 1012 is formed in a long shape having a length longer than the width dimension of the connector 8. Each side portion 1014 is formed in a long shape having a length longer than the dimension of the connector 8 in a vertical direction. The pair of side portions 1014 protrude upward from opposite side portions of the bottom-side coupling portion 1012.

The upper surface of the bottom-side coupling portion 1012 is formed as a flat surface, and the bottom portion of the connector 8 is supported by the upper surface while placed thereon.

Positioning recesses 1015 into which the side portions of a portion of the connector 8 that is located on the side where the terminal 92 are inserted can be fitted are formed in the inward facing portion of the side portions 1014. The positioning recesses 1015 are formed so as to be recessed when viewed from the holder 82 side. The length dimension of the positioning portion 1010 is set to be approximately the same as the height dimension of the connector 8. The surface of the positioning recesses 1015 that face toward the holder 82 are the first positioning portions 1016, and the surfaces of the positioning recesses 1015 that faces the center of the positioning portion 1010 in the width direction are the second positioning portions 1017.

The first positioning portions 1016 formed in the pair of side portions 1014 are provided at the same position in the direction of movement of the connector 8 by the pushing portion 1002. Accordingly, when the connector 8 is pushed by the pushing portion 1002, the end face of the connector 8 that is located on the side where the terminal 92 is inserted simultaneously abut against and are received by the two first positioning portions 1016.

The distance dimension between the second positioning portions 1017 formed at the pair of side portions 1014 is set to be the same as the distance between the side surfaces at the end portion of the connector 8 that is located on the side where the terminal 92 is inserted. Accordingly, when the connector 8 is pushed by the pushing portion 1002, and opposite side portions of the end portion of the connector 8 that is located on the side where the terminal 92 is inserted are disposed between the second positioning portions 1017, the outward facing side surface of the opposite side portions come into contact with the pair of the second positioning portions 1017. Consequently, the end portion of the connector 8 that is located on the side where the terminal 92 is inserted is positioned at a constant position in the width direction (second direction).

The edge portion of the second positioning portion 1017 that is located on the holder 82 side is formed as a guide portion 1017g that gradually expands toward the holder 82. Here, the guide portion 1017g is formed by rounding the edge portion of the second positioning portion 1017 that is located on the holder 82 side. Accordingly, if the position of the opposite side portions of the connector 8 and the position of the second positioning portions 1017 are displaced in the width direction of the connector 8 when disposing the connector 8 between the pair of second positioning portions 1017, the opposite side portions of the connector 8 come into contact with the guide portion 1017g, and are guided to a correct position between the second positioning portions 1017, as shown in FIG. 21. Note that the guide portion may be formed by forming an edge portion of the second positioning portion 1017 that is located on the holder 82 side as an inclined surface.

Note that in the present embodiment, when the positions of a plurality of cavities 81 of one connector 8 are different in the width direction when sequentially inserting the terminals 92 into the cavities 81, the holder 82 and the connector 8 are moved along the second direction by the connector arrangement member transfer mechanism 6, thus adjusting the positions of the cavities 81 into which insertion is made.

Accordingly, the positioning portion 1010 is supported by a positioning portion movement mechanism 1020 so as to be movable along the second direction. As the positioning portion movement mechanism 1020, a linear actuator such as a ball screw-type electric actuator is used. Then, at the time of moving the holder 82 and the connector 8 by the connector arrangement member transfer mechanism 6 according to the position of the cavity 81 into which insertion is made, under control by the control portion 10, the positioning portion 1010 is moved by the positioning portion movement mechanism 1020 with the same direction of movement, the same movement amount, and the same mode as those of the holder 82 and the connector 8. Consequently, at the time of inserting a terminal into any of the cavities 81 of the connector 8, it is possible to move the positioning portion 1010 to a position forward of the opening of the holder 82, thus receiving the connector 8 protruding from the holder 82.

Note that when the insertion position of the terminal 92 is moved in the second direction in accordance with the position of the cavity 81 by the fourth clamping portion-associated mechanism 5, it is not necessary to move the connector 8 in the second direction. At this time, the positioning portion 1010 may be fixed at a constant position.

In any case, the positioning portion 1010 may not be necessarily formed in all of the holders 82, so long as the pushing portion 1002 and the positioning portion 1010 are provided at the terminal insertion position P4.

Since the positioning portion 1010 moves together with the movement of the holder 82 and the connector 8 in the second direction when the positioning portion 1010 is fixed to positions of the fixed seat 61 that oppose the holders 82, it is not necessary to incorporate a dedicated mechanism for moving the positioning portion 1010 in the second direction. In this case as well, in view of the fact that the connector arrangement member 80 is removed from the fixed seat 61 for use in the operation of collecting the wiring module 200, the operation of setting a new connector 8, and the like, the number of positioning portions 1010 can be reduced compared with the total number of the holders 82 used for the operation of the terminal insertion device 100 of the present embodiment as a whole.

The positioning operation performed by the pushing portion 1002 and the positioning portion 1010 will be described in detail.

First, in the initial state in which the holder 82 and the connector 8 have been moved to the terminal insertion position P4, the pushing portion 1002 is located at a position retracted from the holder 82. The positioning portion 1010 is located at a position forward of the opening of the holding recess 83 of the holder.

Figure 22:
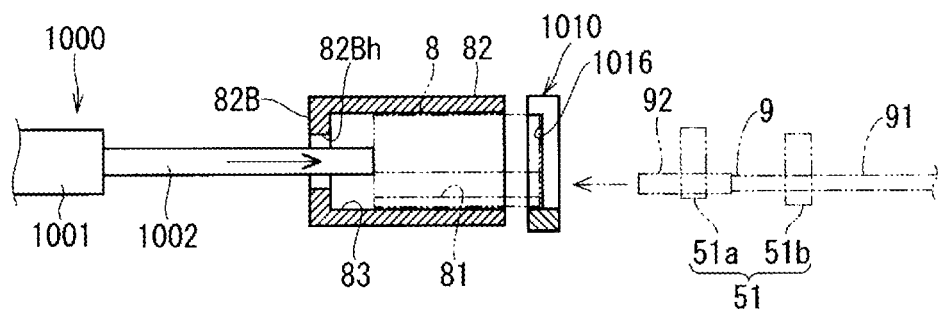
FIG. 22 is a diagram illustrating a positioning operation.

Before the fourth clamping portion-associated mechanism 5 preforms insertion of the terminal 92 in this state, the pushing portion 1002 is driven to advance, as shown in FIG. 22. Consequently, the pushing portion 1002 advances into the holding recess 83 through the pushing hole portion 82Bh, and pushes the connector 8 thereinside. Then, the connector 8 protrudes from the opening of the holding recess 83, and the portion of the connector 8 that is located on the side where the terminal 92 is inserted is received and positioned by the positioning portion 1010. At this time, the end face of the connector 8 that is located on the side where the terminal 92 is inserted abuts against the first positioning portion 1016, so that the connector 8 is accurately positioned in the first direction. The opposite side surfaces of the end portion of the connector 8 that is located on the side where the terminal 92 is inserted abut against and are clamped by the pair of second positioning portions 1017, and therefore, the connector 8 is accurately positioned in the second direction as well.

Figure 23:
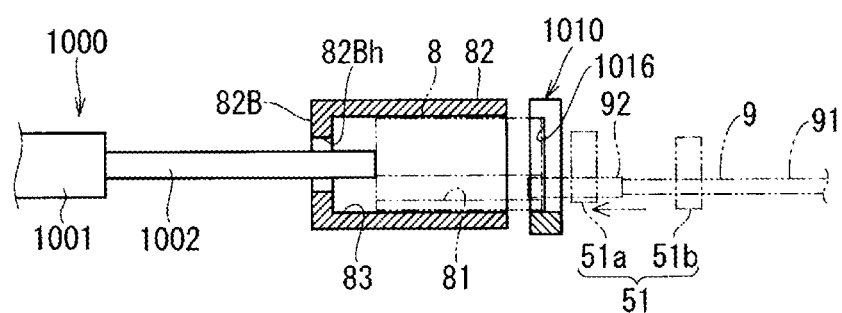
FIG. 23 is a diagram illustrating the positioning operation.
Figure 24:
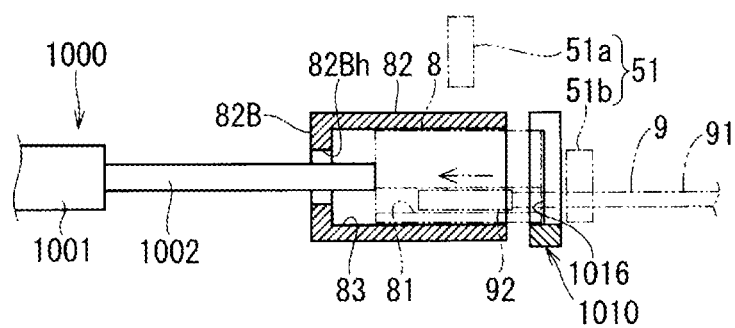
FIG. 24 is a diagram illustrating the positioning operation.

In this state, the fourth clamping portion-associated mechanism 5 inserts the terminal 92 into the cavity 81, as shown in FIGS. 23 and 24. At this time, the connector 8 is accurately positioned by the positioning portion 1010 in the above-described manner, and held while being suppressed from rattling. Accordingly, the terminal 92 can be stably inserted into the cavity 81.

Note that when the connector 8 is moved away from the positioning portion 1010, and brought back into the holding recess 83, the pushing portion 1002 is moved to retract after the terminal 92 has been completely inserted into the cavity 81, and in this state, the terminal 92 may be further moved by the fourth clamping portion-associated mechanism 5 so as to be pushed. Alternatively, another push mechanism that pushes the connector 8 into the holder 82 may be provided.

Effects, Etc.

According to a manufacturing method of the terminal insertion device 100 and the wiring module configured as described above, in a state in which the connector 8 is received and positioned by the positioning portion 1010, the terminal 92 can be inserted into the cavity 81 of the connector 8 at a position forward of the opening of the holding recess 83 of the holder 82. This makes it possible to stably insert the terminal 92 in a state in which the connector 8 is accurately positioned and suppressed from ratting. At this time, the portion of the connector 8 that protrudes from the opening of the holder 82 is positioned by the positioning portion 1010, and therefore, the holder 82 does not need to be manufactured so accurately. This makes it possible to inexpensively manufacture the holder 82 that holds the connector 8.

More specifically, in a state in which the connector 8 is held inside the holding recess 83, the pushing portion 1002 can be inserted into the holding recess 83 through the pushing hole portion 82Bh, thus pushing the connector 8. Accordingly, the state can be smoothly shifted from the state in which the connector 8 is held inside the holding recess 83 to the state in which the connector 8 is positioned and held by the positioning portion 1010.

The push mechanism 1000 and the positioning portion 1010 are provided at the terminal insertion position P4. Accordingly, the number of the push mechanisms 1000 and the positioning portions 1010 to be provided can be reduced, making it possible to relatively inexpensively manufacture the terminal insertion device 100.

The positioning portion 1010 uses the first positioning portion 1016 to position the end face of the connector 8 that is located on the side where the terminal 92 is inserted, and uses the pair of second positioning portions 1017 to position opposite surfaces of the end portion of the connector 8 that are located on the side where the terminal 92 is inserted. Then, when the connector 8 is disposed between the pair of second positioning portions 1017, the connector 8 can be guided between the pair of second positioning portions 1017 by the guide portion 1017g.

The present embodiment has been described, assuming that the shapes of the connectors 8 held in the holders 82 are the same. However, if the shapes of the connectors 8 held in the holders 82 are different, positioning portions corresponding to the connectors 8 having a plurality of shapes may be prepared, and a positioning portion corresponding to the connector into which the terminal is to be inserted may be selectively moved to the terminal insertion position P4. The movement in this case may be achieved, for example, by moving, along the second direction, a member supporting a plurality of positioning portions parallel to each other along the second direction.

Although the present invention has been described above in detail, the foregoing description is in all aspects illustrative and the invention is not limited thereto. It will be appreciated that numerous modifications not illustrated herein can be made without departing from the scope of the present invention.

LIST OF REFERENCE NUMERALS 2 to 5 Terminal insertion mechanism
6 Connector arrangement member transfer mechanism
8 Connector
9 Terminal-equipped wire
51 Fourth clamping portion
51a Front fourth clamping portion 51b Rear fourth clamping portion
80 Connector arrangement member
81 Cavity
82 Holder
82B Bottom portion
82Bh Pushing hole portion
83 Holding recess
91 Wire
92 Terminal
100 Terminal insertion device
200 Wiring module
1000 Push mechanism
1001 Pushing body portion
1002 Pushing portion
1010 Positioning portion
1016 First positioning portion
1017 Second positioning portion
1017g Guide portion

The invention claimed is:

1. A terminal insertion device for inserting a terminal into a cavity formed in a connector, comprising:
   a holder in which a holding recess is formed having an opening on a terminal insertion side of the holder and is configured to hold the connector so as to be movable along a direction of insertion of the terminal into the cavity;
   a pusher located on a side of the holder opposite the terminal insertion side that pushes, along the direction of insertion of the terminal into the cavity, the connector from within the holding recess to a position at which a portion of the connector protrudes from the opening;
   a positioner located at a position forward of the opening that receives and positions the connector pushed by the pusher at the position forward of the opening; and
   a terminal inserter that inserts the terminal into the cavity of the connector received and positioned by the positioner.

2. The terminal insertion device according to claim 1, wherein
   a pushing hole is formed in a portion of the holder that is located on a side opposite to the opening, and
   the pusher includes a pushing portion that is inserted into the holding recess through the pushing hole to push the connector.

3. The terminal insertion device according to claim 2, further comprising
   a holder transporter that transports a plurality of the holders along a connector transport path in a condition in which the holders are arranged, wherein
   the pusher and the positioner are provided at a position in the connector transport path at which the terminal inserter inserts the terminal into the cavity of the connector held by each of the holders.

4. The terminal insertion device according to claim 2, wherein
   the positioner includes a first positioning portion configured to abut against a portion of the connector that is located on the terminal insertion side of the holder where the terminal is inserted, and a second positioning portion configured to abut against opposite side portions of the connector, and
   an edge portion of the second positioning portion located on a side of the positioner facing the holder and is formed as a guide portion that gradually expands outward toward the holder.

5. The terminal insertion device according to claim 3, wherein
   the positioner includes a first positioning portion configured to abut against a portion of the connector that is located on the terminal insertion side of the holder where the terminal is inserted, and a second positioning portion configured to abut against opposite side portions of the connector, and
   an edge portion of the second positioning portion located on a side of the positioner facing the holder and is formed as a guide portion that gradually expands outward toward the holder.

6. The terminal insertion device according to claim 1, further comprising
   a holder transporter that transports a plurality of the holders along a connector transport path in a condition in which the holders are arranged, wherein
   the pusher and the positioner are provided at a position in the connector transport path at which the terminal inserter inserts the terminal into the cavity of the connector held by each of the holders.

7. The terminal insertion device according to claim 6, wherein
   the positioner includes a first positioning portion configured to abut against a portion of the connector that is located on the terminal insertion side of the holder where the terminal is inserted, and a second positioning portion configured to abut against opposite side portions of the connector, and
   an edge portion of the second positioning portion located on a side of the positioner facing the holder and is formed as a guide portion that gradually expands outward toward the holder.

8. The terminal insertion device according to claim 1, wherein
   the positioner includes a first positioning portion configured to abut against a portion of the connector that is located on the terminal insertion side of the holder where the terminal is inserted, and a second positioning portion configured to abut against opposite side portions of the connector, and
   an edge portion of the second positioning portion located on a side of the positioner facing the holder and is formed as a guide portion that gradually expands outward toward the holder.

9. A wiring module manufacturing method for inserting a terminal at an end portion of a terminal-equipped wire into a cavity of a connector, the method comprising:
   (a) pushing the connector, which is held within a holder, to a position against a connector positioner spaced from the holder along a direction of insertion of the terminal into the cavity, so that a portion of the connector is moved to protrude from the holder; and
   (b) inserting the terminal into the cavity of the connector while the connector is positioned against by the connector positioner.

10. The method according to claim 9, wherein the holder is formed with a holding recess having an opening and wherein the connector is movable within the holding recess along the direction of insertion of the terminal.

* * * * *